United States Patent [19]
Shibata et al.

[11] Patent Number: 6,078,438
[45] Date of Patent: Jun. 20, 2000

[54] VIBRATION ACTUATOR AND LENS BARREL

[75] Inventors: Mine Shibata, Tokyo; Tunemi Gonda, Yamato; Tadao Takagi, Yokohama; Tsuyoshi Matsumoto, Tokyo; Michihiro Tobe, Yokohama, all of Japan

[73] Assignee: Nikon Corporation, Tokyo, Japan

[21] Appl. No.: 09/059,466

[22] Filed: Apr. 14, 1998

[30] Foreign Application Priority Data

| Apr. 14, 1997 | [JP] | Japan | 9-095790 |
| Nov. 25, 1997 | [JP] | Japan | 9-323014 |
| Feb. 10, 1998 | [JP] | Japan | 10-028212 |
| Feb. 12, 1998 | [JP] | Japan | 10-029696 |
| Mar. 23, 1998 | [JP] | Japan | 10-074111 |

[51] Int. Cl.⁷ .................................................. G02B 7/02
[52] U.S. Cl. ............................................. 359/819; 359/824
[58] Field of Search .................................. 359/819, 824; 310/323

[56] References Cited

U.S. PATENT DOCUMENTS

| 5,200,665 | 4/1993 | Iijima | 310/323 |
| 5,760,528 | 6/1998 | Tomikawa | 310/323 |

FOREIGN PATENT DOCUMENTS

| 59-111117 | 6/1984 | Japan . |
| 7-143770 | 6/1995 | Japan . |
| 8-211270 | 8/1996 | Japan . |
| 10-23769 | 1/1998 | Japan . |
| 10-23770 | 1/1998 | Japan . |

OTHER PUBLICATIONS

Takehiro Takano, et al., "Ultrasonic Linear Motor Using a Piezoceramics Annular Plate", EOS vol. 8, No. 1, pp. 1–9, 1995.

Sadayuki Ueba, et al., New Edition Ultrasonic Motors, White Series No. 132, Dec. 20, 1991, pp. 143–144.

"Piezoelectric Linear Motors For Moving Optical Pickup" (5th Symposium on Dynamics Related to Electromagnetic Force, Collected Papers: Joint Auspices of Japan Mechanical Society, Electrical Society, and Japan AEM Society, Jun. 9–11, 1993, Hitachi City), pp. 393–398.

Takehiro Takano, et al., "Characteristics of the Ultrasonic Linear Motor Using Radial and Nonaxisymmetric Vibration Modes of an Annular Plate", vol. 34 (1995), Part 1, No. 9B, Sep., 1995, pp. 5288–5291.

Takehiro Takano, et al., Characteristic Improvement of Linear Ultrasonic Motor Using (R.1)–(1,1) Mode Piezoelectric Ring, pp. 79–80.

Akira Teratani, et al., A Linear Motor Using a (R,1)–1,1) Mode Piezoelectric Annulus–Investigation of Vibration Displacements and Admittance, Tohoku Institute of Technology, Sep., 1995, pp. 88–89.

Primary Examiner—Georgia Epps
Assistant Examiner—Suzanne Letendre

[57] ABSTRACT

A vibration actuator drive device using a linear type of ultrasonic actuator to drive a rotary member with high accuracy and good efficiency. The vibration actuator drive device includes an ultrasonic actuator which, by applying drive signals, produces longitudinal vibration and bending vibration to generate a drive force, and a rotary member in contact with the ultrasonic actuator. The combination of longitudinal vibration and bending vibration in the ultrasonic actuator generates relative motion in the rotary member having a circular locus of predetermined width. A compression mechanism causes compressive contact of the ultrasonic actuator with the rotary member. The longitudinal vibration vibrates in a direction about parallel to the direction of the drive force, and the bending vibration vibrates in a direction intersecting the longitudinal vibration. A drive force is transmitted to the rotary member at the inner circumferential side of the circular locus, and greatly differs from the drive force which is transmitted to the rotary member at the outer circumferential side. A lens barrel including a vibration actuator drive device drives a focus adjustment lens group in the optical axis direction by the conversion of the rotary motion of the rotary member to linear motion.

28 Claims, 31 Drawing Sheets

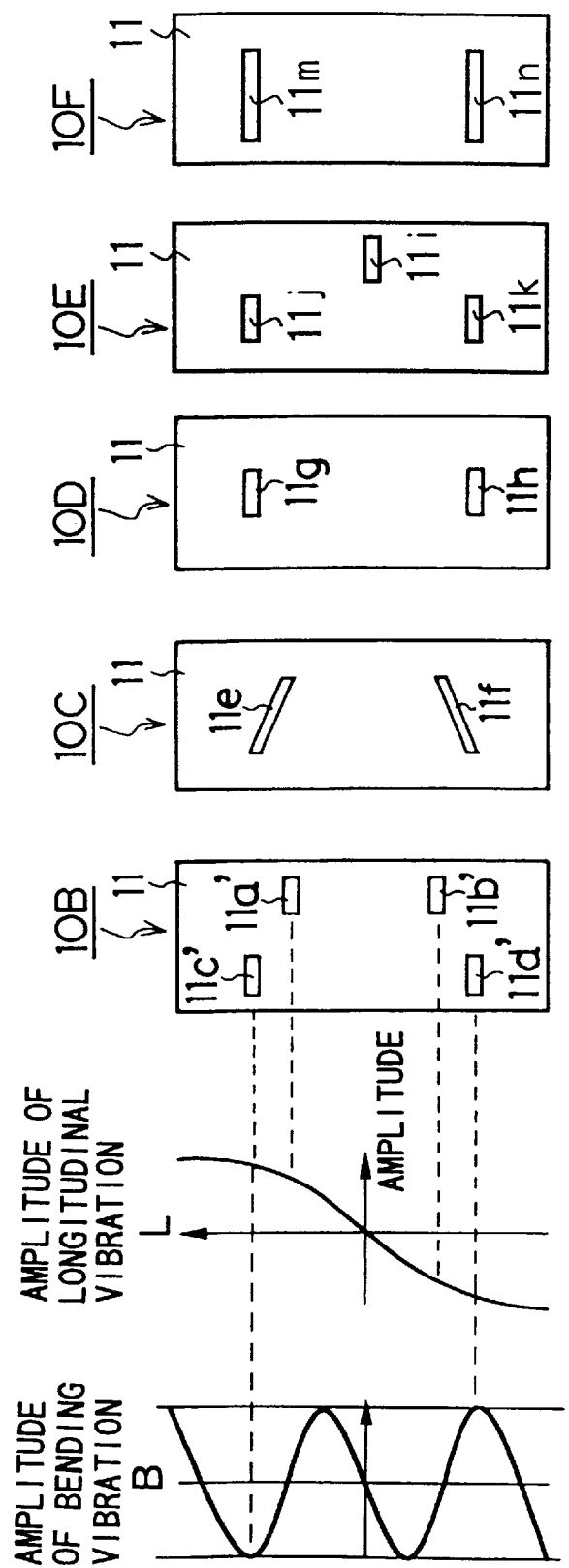

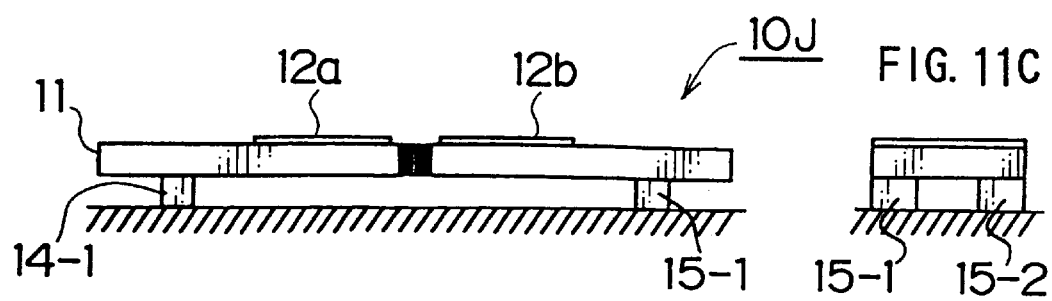
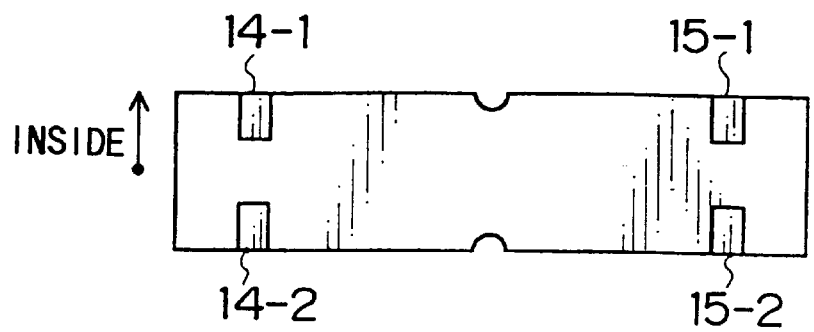

B-B CROSS SECTION

A-A CROSS SECTION

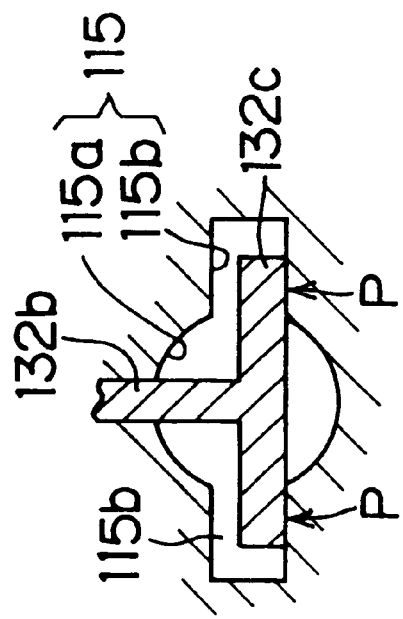
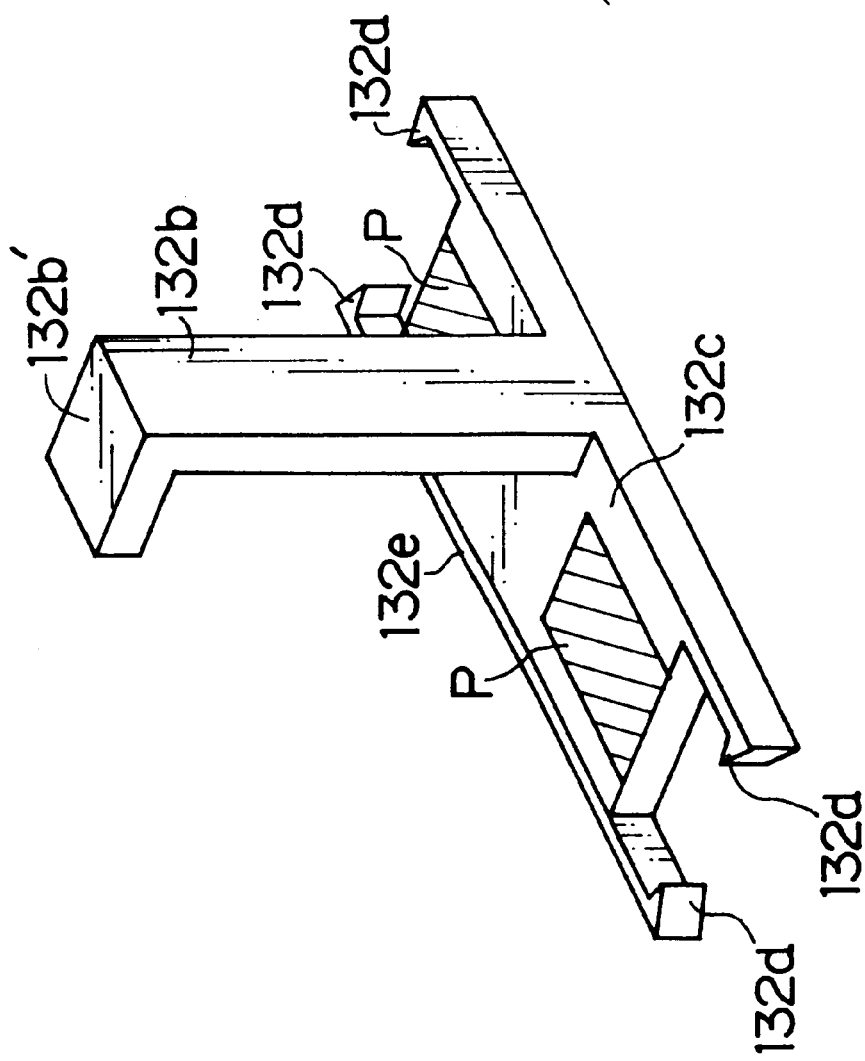
FIG. 29(a)
FIG. 29(b)

VIBRATION ACTUATOR AND LENS BARREL

INCORPORATION BY REFERENCE

The following material is herein incorporated by reference: 222 Piezoelectric Linear Motors for Application to Driving a Light Pick-Up Element, by Tomikawa et al., 5th Symposium on Dynamics Related to Electromagnetic Force, Collected Papers, pages 393–398, Jun. 9–11, 1993; Japanese Laid-open Patent Application No. 7-143770; U.S. patent application Ser. No. 08/377,466 now U.S. Pat. No. 5,697,375 (which is based on JP 7-143770); Ultrasonic Linear Motor Using an Annular Piezoelectric Vibration Element. Takihiro et al., 1995; and (New Edition, Ultrasonic Motors, Torikeppsu Edition: dated Dec. 20, 1991, pp. 67–68, 143–144).

CROSS-REFERENCE TO RELATED APPLICATIONS

This application is based upon and claims priority of Japanese Patent Application No. 9-95790, filed Apr. 14, 1997; Japanese Patent Application No. 9-23014, filed Nov. 25, 1997; Japanese Patent Application No. 10-28212, filed Feb. 10, 1998; Japanese Patent Application No. 10-29696, filed Feb. 12, 1998 and Japanese Patent Application No. 10-74111, filed Mar. 23, 1998, the contents being incorporated herein by reference.

BACKGROUND OF THE INVENTION

1. Field of the Invention

The present invention relates to a vibration actuator drive device which uses a vibration actuator to generate relative motion of relative motion members, and more particularly, the present invention relates to a vibration actuator drive device which generates relative motion of relative motion members on a curved locus between relative motion members using a linear type of vibration actuator. Moreover, the present invention relates to a lens barrel using a vibration actuator drive device for driving a lens group in an optical axis direction to change the focal point or focal distance of a photographic optical system.

2. Description of the Related Art

Vibration actuators are conventionally used as a motive power source for driving lenses because vibration actuators have features such as good control characteristics, noiselessness, and high torque. For example, vibration actuators are conventionally used in lens barrels as the motive power source for an automatic focus adjustment mechanism. Moreover, vibration actuators are also used as the motive power source for a so-called power zoom to perform the electromotive adjustment of focal distance in a zoom lens barrel. For example, Japanese Laid-Open Patent Publication JP-A-59-111117 discloses a lens barrel which uses an annular vibration actuator (referred to hereinbelow as an "annular type vibration actuator"). The annular type vibration actuator is a rotary type of vibration actuator which outputs a rotary drive force.

Furthermore, linear types of vibration actuators are known which output a rectilinear drive force. For example, the constitution and load characteristics of a linear type vibration actuator are described in "Piezoelectric Linear Motor with Optical Pickup Motion as Object" (Yoshiroh Tomikawa et al.: 5th Dynamics Symposium Relating to Electromagnetic Force, Collected Papers, pp. 393–398). The linear type of vibration actuator consists of an elastic member having a flat plate form and an electromechanical converting element brought into contact with the elastic member. By applying an alternating current to the electromechanical converting element, a longitudinal vibration and a bending vibration are generated in the elastic member, thereby causing an elliptical vibration to be generated in the surface of the elastic member.

Japanese Laid-Open Patent Publication JP-A-8-211279 discloses a lens barrel having both an annular type of vibration actuator to drive a focus adjustment lens group for adjusting the focus, and a linear type of vibration actuator to drive a focal distance adjustment lens group for adjusting the focal distance. FIG. 31 is a cross-sectional diagram of the lens barrel disclosed in JP-A-8-211279. As shown in FIG. 31, the lens barrel includes a vibration actuator 210 located on an outer circumferential side of a focus adjustment lens group L201. The vibration actuator 210 is an annular type of vibration actuator consisting of a stator 211 and a rotor 212. In operation, a rotary tube 202 is driven to rotate by the rotary motion of the rotor 212. The rotation of the rotary tube 202 is transmitted to a frame 206 of the focus adjustment lens group L201 via a key groove 202a and a key 206a, thereby causing the frame 206 to rotate integrally with the rotary tube 202. Furthermore, the rotary motion of the frame 206 is converted into a rectilinear motion in the optical axis direction by a helicoid 209 coupled to a fixed tube 201. As a result, the frame 206 and the focus adjustment lens group L201 move in the optical axis direction.

Furthermore, as shown in FIG. 31, a linear type of vibration actuator 205 is located on an outer circumferential side of a focal length adjustment lens group L202. The linear type vibration actuator 205 is in contact with a flat unit 207a disposed on the outer circumferential surface of a frame 207. When the vibration actuator 205 is driven, a driving force in the optical axis direction is applied to the flat unit 207a. As a result, the frame 207 and the focal length adjustment lens group L202 move in the optical axis direction, guided by a linear guide 208 which penetrates through the frame 207.

However, the following problems occur in the prior art lens barrels described above. Firstly, when a frame of a photographic optical system is rectilinearly driven in the optical axis direction using a linear type of vibration actuator, the position setting accuracy of the frame is decided by a minimum distance which the vibration actuator can cause the frame to move (referred to hereinbelow as a "drive unit"). Accordingly, the accuracy of focus adjustment or focal length adjustment cannot be increased above the drive unit of the linear type of vibration actuator.

Moreover, in an annular type of vibration actuator, high surface accuracy is required in the contact surfaces of both the stator and the rotor. The surface accuracy does not particularly become a problem in a small type of vibration actuator. However, the difficulty of maintaining a suitable surface accuracy in the contact surfaces becomes a problem in a vibration actuator used in a lens barrel because the stator and rotor come to have a large diameter on the same order as the diameter of the lens barrel.

SUMMARY OF THE INVENTION

It is an object of the present invention to provide a vibration actuator drive device including a linear type of vibration actuator to drive relative motion members in a curved locus with high accuracy and with good efficiency.

It is another object of the present invention to provide a vibration actuator drive device having a small ratio of internal to external diameter and having good space efficiency with respect to length in a rotation axis direction.

Yet another object of the present invention is to provide a lens barrel including a vibration actuator drive device to drive a focus adjustment lens group with a high position setting accuracy of the focus adjustment lens group, and furthermore a lens barrel of a structure which does not require high surface accuracy.

Objects and advantages of the present invention are achieved in accordance with a first embodiment of the present invention with a vibration actuator device comprising a vibration actuator to produce a drive force causing the generation of a first vibration and a second vibration; a relative motion member in contact with the vibration actuator to perform relative motion with respect to the vibration actuator in a curved line locus having a circular or circular arcuate locus of a predetermined amplitude, by means of the first and second vibrations; and a compression mechanism to cause compressive contact between the vibration actuator and the relative motion member, wherein the first vibration vibrates in a direction about parallel to the direction of the drive force, the second vibration vibrates in a direction which intersects the direction of the first vibration, and the drive force transmitted to the relative motion member at an inner circumferential side of the curved line locus of the relative motion member and the drive force transmitted to the relative motion member at an outer circumferential side of the curved line locus are different in magnitude.

The drive force extracted from the inner circumferential side of the curved locus and the drive force extracted from the outer circumferential side of the curved locus can be set based on the circumferential speed of the inner circumferential side and the circumferential speed of the outer circumferential side, with respect to the respective relative motion members.

The vibration actuator includes a drive force output portion contacting the relative motion member to transmit the drive force to the relative motion member, wherein the second vibration is a bending vibration and the amplitude of the bending vibration in the drive force output portion is set based on the circumferential speed with respect to the relative motion member in the position contacting the relative motion member.

The vibration actuator includes a drive force output portion contacting the relative motion member to transmit the drive force to the relative motion member, wherein the first vibration is a longitudinal vibration, and the amplitude of the longitudinal vibration in the drive force output portion is set based on the circumferential speed with respect to the relative motion member in the position contacting the relative motion member.

The vibration actuator includes a plurality of drive force output portions contacting the relative motion member to transmit the drive force to the relative motion member, wherein the plurality of drive force output portions are located on the curved line locus and the number of drive force output portions is decided based on the circumferential speed with respect to the relative motion member in the position contacting the relative motion member.

The vibration actuator includes a drive force output portion which contacts the relative motion member to transmit the drive force to the relative motion member, wherein the drive force output portion contacts the relative motion member in one of the inner circumferential side and the outer circumferential side of the curved line locus.

The vibration actuator includes a drive force output portion contacting the relative motion member to transmit drive force to the relative motion member, wherein the compression mechanism generates the compressive force acting between the drive force output portion and the relative motion member, and the compressive force is set based on the circumferential speed with respect to the relative motion member in a contact position of the drive force output portion and the relative motion member.

The vibration actuator includes a drive force output portion contacting the relative motion member to transmit drive force to the relative motion member, wherein the respective coefficients of friction in a contact surface of the relative motion member and the drive force output portion differ according to location.

The drive force output portion includes a plurality of members in the width direction of the vibration actuator respectively comprising different materials.

The relative motion member is subdivided into a plurality of sections in the width direction of a contact surface with the vibration actuator, the plurality of sections respectively comprising different materials.

The compression mechanism includes a plurality of compression mechanisms in the width direction of the vibration actuator, the plurality of compression mechanisms being set to respective different compressive forces.

The relative motion member has a ring shape and the compression mechanism includes a ring-shaped base unit, a plate spring unit cantilever supported on the base unit, and a support unit to support the vibration actuator disposed in a free end side of the plate spring unit.

The free end of the plate spring unit may face in the circumferential direction of the relative motion member.

The free end of the plate spring unit may face in the radial direction of the relative motion member. Accordingly, the plate spring unit may be capable of adjusting the compression force in the diameter direction.

The relative motion member has a ring shape and includes a compression mechanism to compress the vibration actuator and the relative motion member, and a support mechanism to support the vibration actuator. The support mechanism includes a first support unit to support the vibration actuator from an upper surface, and a second support unit to support the vibration actuator from a side surface.

In accordance with embodiments of the present invention, a lens barrel comprises a vibration actuator drive device; a support member, movable in the direction of the optical axis of an optical system to support at least one portion of the optical system; and a conversion unit to convert rotary motion around the optical axis to linear motion in the optical axis direction and to transmit the linear motion to the support member. The relative motion member includes a rotary unit rotatable around the optical axis, and the vibration actuator drives the rotary unit to rotate by frictional contact with a portion of the rotary unit, or, disposed in the rotary unit, by frictional contact of the rotary unit and a portion of a facing other member, drives the rotary unit in rotation, and the conversion unit converts the rotary motion of the rotary unit into rectilinear motion in the optical axis direction.

The vibration actuator of the lens barrel includes a drive force output portion in contact with the relative motion member, which can be a lens barrel in which the coefficient of friction differs according to position in the contact surface of the drive force output portion and the relative motion member.

The vibration actuator of the lens barrel includes a compression mechanism, a ring shaped base member, a plate spring unit which is cantilevered on the base unit, and, disposed in a free end side of the plate spring unit, a support unit to support the vibration actuator.

Moreover, in accordance with embodiments of the present invention, a vibration actuator drive device includes a vibration actuator which generates drive forces to harmonically generate a stretching vibration which expands and contracts in a predetermined plane, and a non-axially symmetric vibration; and a relative motion member contacting the vibration actuator, which performs relative motion including rotary motion in at least one portion with respect to the vibration actuator, wherein the direction of the rotation axis in the rotary motion is about parallel to the predetermined plane, and also about orthogonal to the vibration direction of the nonaxially vibration.

The vibration actuator includes a vibration element formed in a plate shape, and a compression mechanism to generate a compressive force between the vibration element and the relative motion member. An aperture portion is disposed in the vibration element, including the center of the vibration element in the predetermined plane, and the compression mechanism causes the compressive force to act in the vicinity of the aperture portion of the vibration element.

The compression mechanism comes into contact with the vibration element in a thickness portion of the vibration element in the aperture portion, and causes compressive force to act on a contact surface.

A flat surface portion is formed in the aperture portion, about parallel to the vibration direction of the non-axially symmetric vibration, and the compression mechanism comes into contact with the vibration element in the thickness portion of the vibration element in the flat surface portion, causing the compressive force to act on the contact surface and compresses the vibration element in the direction of the relative motion member.

A location control member controls the motion in a direction intersecting a surface which includes the stretching vibration of the vibration element.

In accordance with another preferred embodiment of the present invention, a lens barrel includes a support movable in an optical axis direction of an optical system to support at least a portion of the optical system; a vibration actuator drive device; a conversion unit which transmits to the support member and converts rotary motion around the optical axis to linear motion in the optical axis direction. The vibration actuator drive device includes a relative motion member having a rotary unit which is rotatable around the optical axis and a vibration actuator to drive the rotary unit to rotate by frictional contact with a portion of the rotary unit, or, disposed in the rotary unit, by frictional contact of the rotary unit and a portion of a facing other member, drives the rotary unit in rotation. The conversion unit converts the rotary motion of the rotary unit into rectilinear motion in the optical axis direction.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 7(a1)–7(f) illustrate a vibration actuator drive device in accordance with third through seventh embodiments of the present invention.

FIGS. 11(a)–11(c) illustrate the vibration actuator of the vibration actuator drive device in accordance with the eleventh embodiment of the present invention.

FIGS. 29(a) and 29(b) illustrate a support and compression mechanism of the vibration actuator drive device shown in of FIG. 28.

DESCRIPTION OF THE PREFERRED EMBODIMENTS

Figure 1:
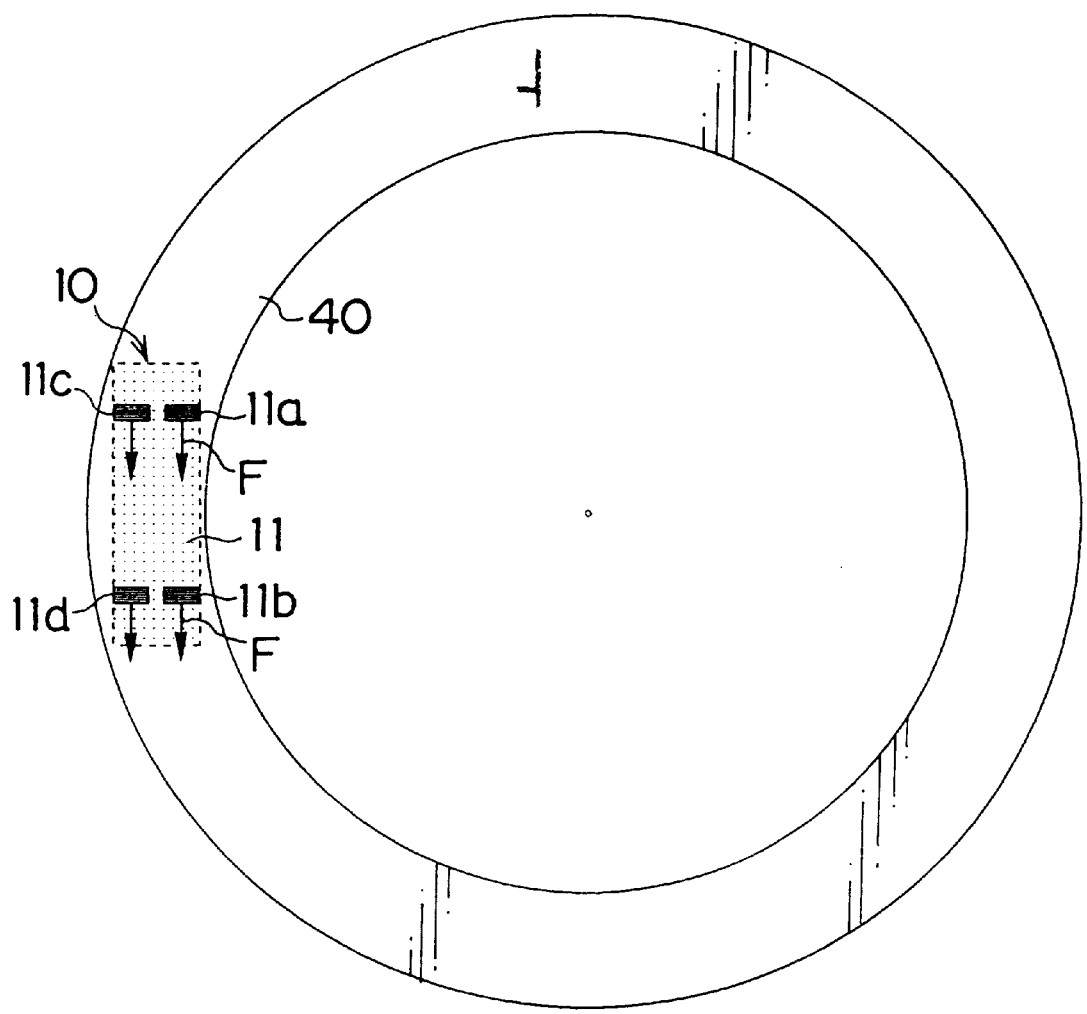
FIG. 1 illustrates a vibration actuator drive device in accordance with a first embodiment of the present invention.

Reference will now made in detail to the present preferred embodiments of the present invention, examples of which are illustrated in the accompanying drawings, wherein like reference numerals refer to the like elements throughout.

First Preferred Embodiment of Vibration Actuator Drive Device

In the following description, the vibration actuator is an ultrasonic actuator which operates in the ultrasonic region. However, the present invention is not limited to an ultrasonic actuator.

FIG. 1 illustrates a vibration actuator drive device in accordance with a first preferred embodiment of the present invention. More particularly, FIG. 1 illustrates a vibration actuator drive device seen from the rear direction having an ultrasonic actuator 10 and a relative motion member 40, which is a ring-shaped rotary element. The ultrasonic actuator 10 includes an elastic member 11 having drive force output portions 11a, 11b, 11c and 11d formed in the lower surface of the elastic member 11. A compression mechanism 30 (see FIGS. 4 and 5) provides compressive contact between the ultrasonic actuator 10 and rotary element 40. In operation, the ultrasonic actuator 10, which is in compressive contact with the rotary element 40, generates a linear drive force to drive the rotary element 40 in rotary motion.

Figure 2:
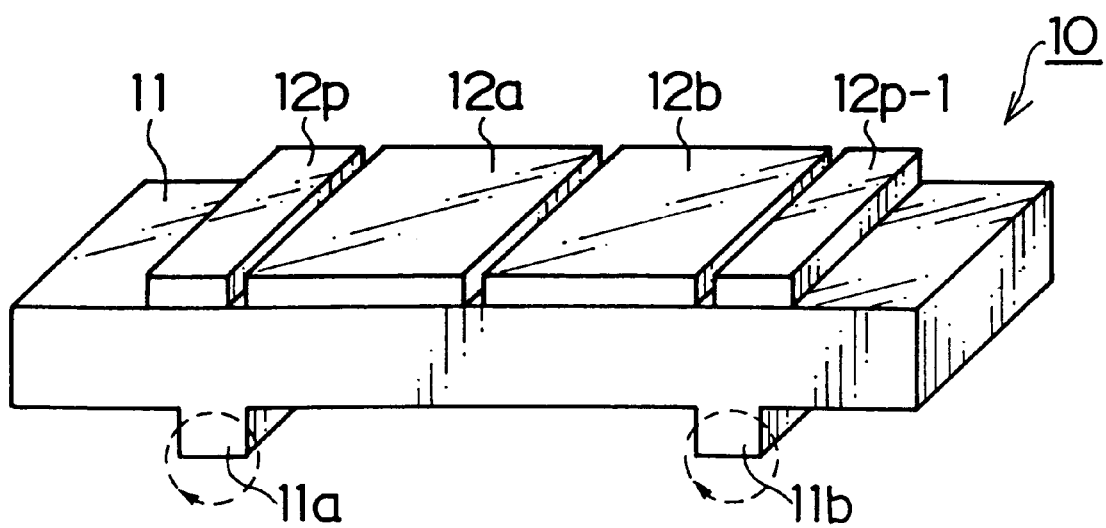
FIG. 2 is an oblique view of an ultrasonic actuator used in accordance with the first embodiment of the present invention.

FIG. 2 is an oblique view of the ultrasonic actuator 10 in accordance with the first preferred embodiment of the present invention. The ultrasonic actuator 10 includes piezoelectric elements 12a, 12b, 12p, 12p-1 adhered to an upper surface of the elastic member 11. The elastic member 11 has a rectangular shape and comprises metal, plastic or the like. As shown in FIGS. 1 and 2, drive force output portions 11a, 11b, 11c and 11d are formed on a lower side of the elastic member 11. The drive force output portions 11a and 11b are disposed parallel to the respective drive force output portions 11c and 11d (not shown in FIG. 2). The drive force output portions 11a–11d are disposed at the positions of the antinodes of the fourth order bending vibration generated in the elastic body 11 as they are pressed against the rotary element 40.

The structure of the ultrasonic actuator 10 is disclosed in, for example, the Fifth Dynamic Symposium Related to Electromagnetic Force, Collected Papers "222 Piezoelectric Linear Flat Plate Motor for Use in Optical Pickups". Moreover, the structure of the ultrasonic actuator 10 is also disclosed in Japanese Laid-Open Patent Publication JP-A-7-143770.

The piezoelectric elements 12a, 12b are electromechanical conversion elements which convert electrical energy to mechanical energy by the application of electrical drive signals. The electromechanical conversion elements 12a, 12b generate in the elastic member 11 a first vibration which is a first order longitudinal vibration (L1 mode), and a second vibration which is a fourth order bending vibration (B4 mode). The piezoelectric elements 12p, 12p-1 are used to monitor the vibrations which are generated in the elastic member 11.

The ultrasonic actuator 10 is designed so that the characteristic frequencies of the first order longitudinal vibration and the fourth order bending vibration in the elastic member 11 are very close together. The first and second vibrations are generated by applying two alternating voltages which differ in phase to the piezoelectric elements 12a, 12b. Since the characteristic frequencies of the first and second vibrations generated in the elastic member 11 are very close together, two vibrations cause harmonized vibration to arise. The ultrasonic actuator 10 can satisfy the above-described conditions by setting, for example, a length of 20 millimeters (mm), a thickness of 2 mm, and a width at a value which is not close to the thickness.

Figure 3:
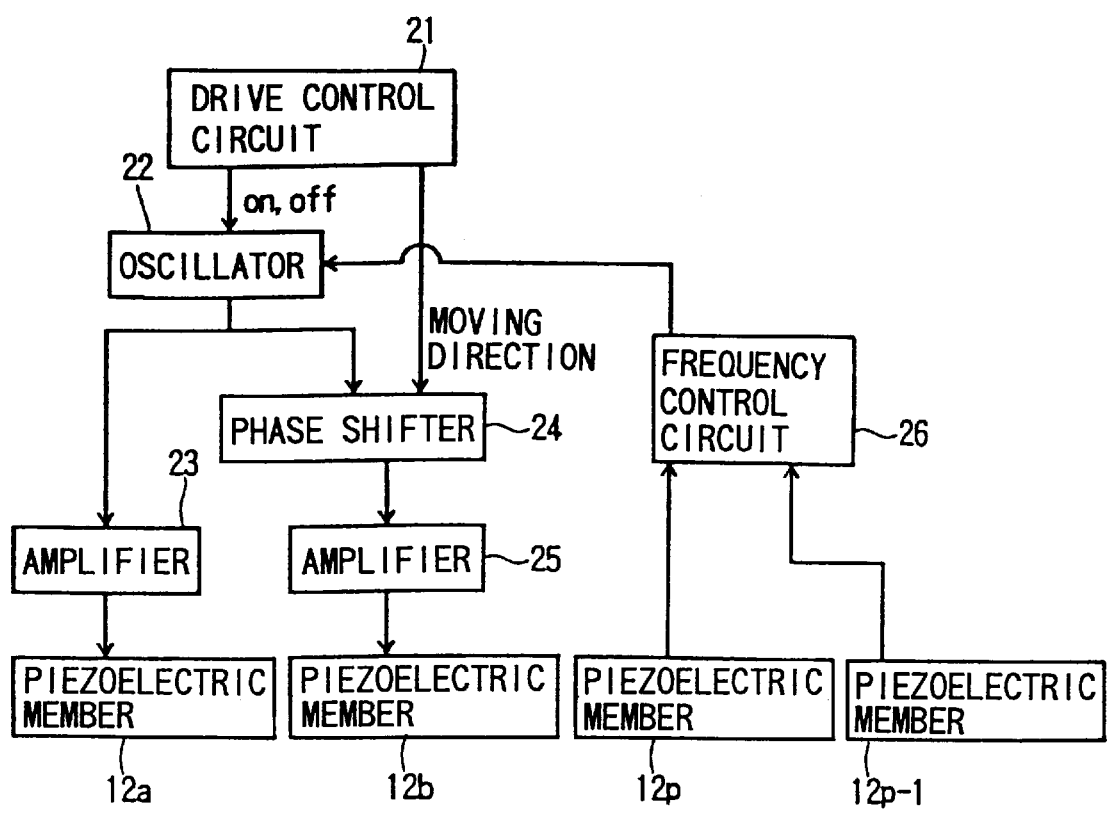
FIG. 3 is a block diagram of a drive circuit for the ultrasonic actuator in accordance with the first embodiment of the present invention.

FIG. 3 is a block diagram of a drive circuit for the ultrasonic actuator in accordance with the first preferred embodiment of the present invention. As shown in FIG. 3, a drive control circuit 21 is connected to operating switches (not shown in the figure). For example, the operating switches produce on/off signals instructing whether or not to perform power zoom or autofocus. In response to the signals from the operating switches, the drive control circuit 21 forms drive control signals which include signals instructing forward direction or reverse direction (i.e., zoom up or zoom down). Outputs of the drive control circuit 21 are connected respectively to an oscillator 22 and a phase shifter 24. The oscillator 22 generates high frequency signals based on on/off control signals from the drive control circuit 21. An output of the oscillator 22 branches, on one side, to connect to the piezoelectric element 12a via an amplifier 23. The output of the oscillator 22 also branches to a phase shifter 24 which phase shifts the output by 90°, and is connected to the piezoelectric element 12b via an amplifier 25.

Moreover, the phase shifter 24 controls the phase based on forward direction or reverse direction control signals from the drive control circuit 21. A frequency control circuit 26 receives outputs of piezoelectric elements 12p, 12p-1 and generates control signals such that the frequency is made high or low based on the outputs of the piezoelectric elements 12p, 12p-1 when a voltage detected by the piezoelectric 12p, 12p-1 is higher or lower than a standard voltage. The output of the frequency control circuit 26 is connected to the oscillator 22.

As described above, in accordance with the first preferred embodiment of the present invention, when alternating signals having a mutual phase difference of 90° are input to the piezoelectric elements 12a and 12b, the piezoelectric elements 12a and 12b generate a stretching vibration, and excite in the elastic member 11 the above-described first order longitudinal vibration and fourth order bending vibration. As a result, those optional points of the elastic member 11 which are positioned in nodal regions of the longitudinal vibration or the bending vibration are eliminated, and an elliptical motion which rotates in a fixed direction is generated. Further, as shown by the dashed lines in FIG. 2, the tips of the drive force output portions 11a, 11b move in an elliptical motion in a fixed direction to generate drive force. Furthermore, the direction of rotation of the elliptical motion differs according to whether the phase shifter 24 causes a 90° advance or delay of the alternating signals.

Figure 4:
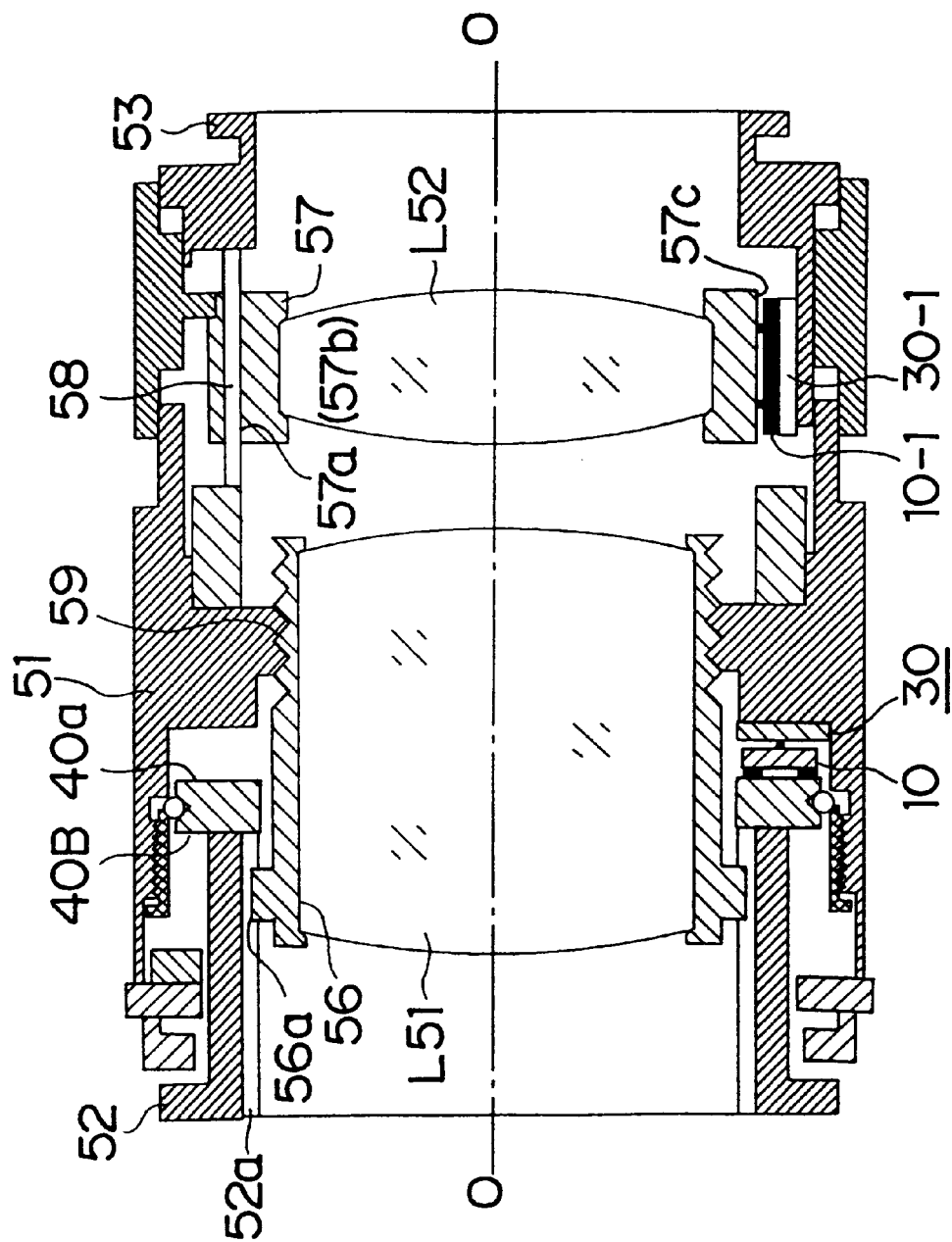
FIG. 4 is a cross sectional view of a lens barrel in accordance with the first embodiment of the present invention.
Figure 5:
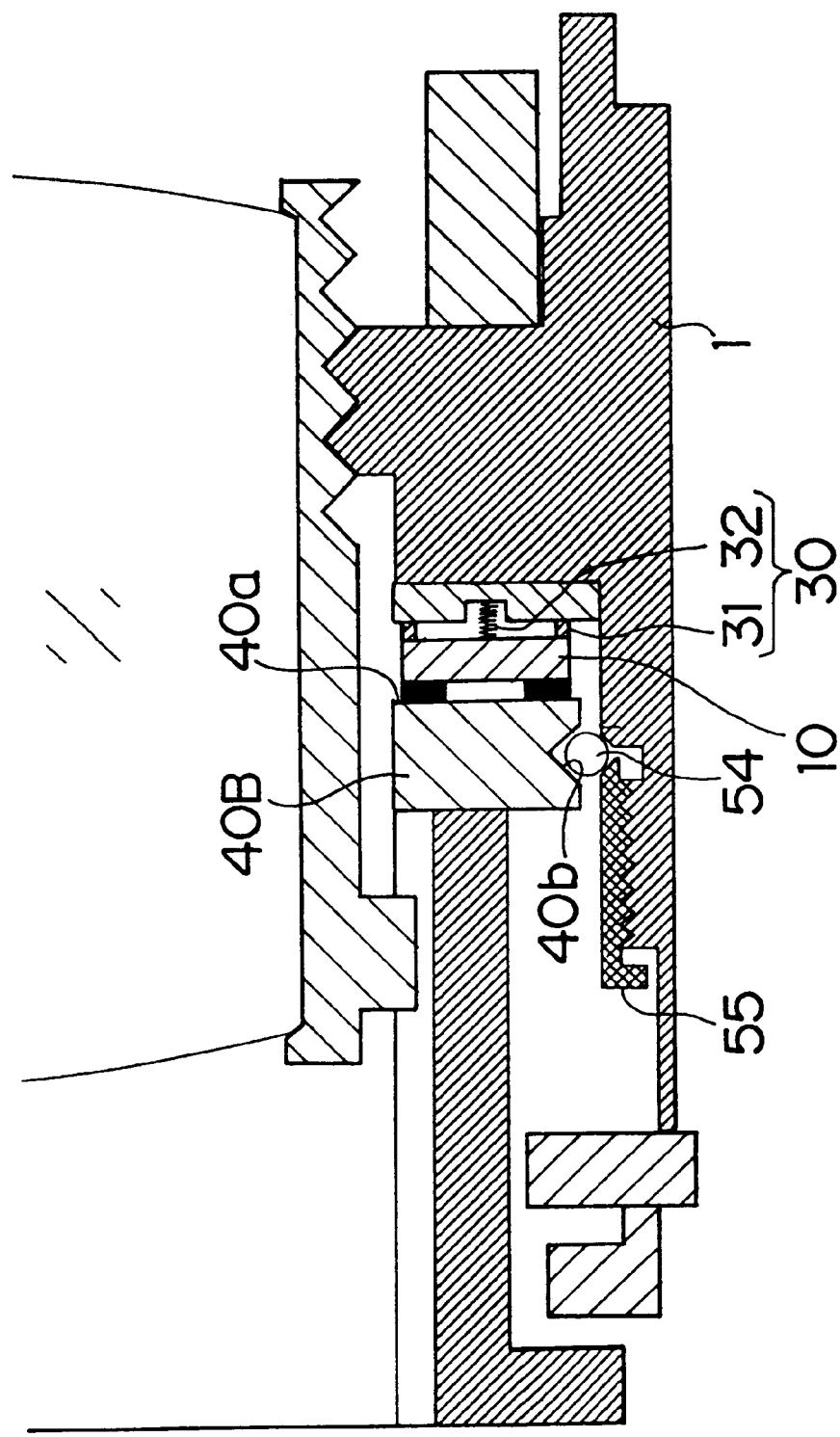
FIG. 5 is an enlarged cross sectional diagram of a portion of the lens barrel including the ultrasonic actuator in accordance with the first embodiment of the present invention.

A lens barrel which utilizes the vibration actuator drive device shown in FIGS. 1–3 will now be described with reference to FIGS. 4 and 5. FIG. 4 is a cross-sectional view of a lens barrel having a vibration actuator drive device in accordance with preferred embodiments of the present invention. FIG. 5 is an enlarged cross-sectional view of a portion of the lens barrel shown in FIG. 4 including the ultrasonic actuator 10. As shown in FIG. 4, a lens frame 56 supports a focus adjustment lens group L51. The lens frame 56 includes a helicoid 59 which engages with a fixed tube 51. A rotary tube 52 is mounted in the optical axis direction of the fixed tube 51 to rotate freely. A key groove 52a is formed in the internal circumference of the rotary tube 52, parallel to the optical axis. Moreover, a key 56a, which engages with the key groove 52a, is formed in the lens frame 56 of the focus adjustment lens group L51.

A rotary element 40B is integrally fixed to an end portion of the rotary tube 52 in the optical axis rear direction. The rotary element 40B includes a flat portion 40a, as shown in an enlarged manner in FIG. 5, in the optical axis rear direction which intersects the optical axis at right angles. Moreover, a ball 54 (FIG. 5) is in rotary contact with the rotary element 40B with respect to the fixed tube 51, and insures the smooth rotary motion of the rotary element 40B. A check ring 55 is screwed into an inner circumferential side of the fixed tube 51 in the optical axis forward direction of the ball 54. The check ring 55 limits the movement of the ball 54 in the optical axis direction. As a result of the action of the check ring 55, the ball 54 does not fall out of the lens barrel after the ball 54 has been assembled into the lens barrel. Moreover, the check ring 55 limits the movement of the ball 54 and the rotary element 40B in the optical axis direction.

Consequently, by enlarging the distance between the rotary element 40B and the ultrasonic actuator 10, the transmission efficiency of the drive force to the rotary element 40B is not reduced.

The ultrasonic actuator 10 is located rearward of the rotary element 40B in the optical axis direction so as to face the flat portion 40a. The compression mechanism 30 provides a compressive force causing the ultrasonic actuator 10 to come into contact with the rotary element 40B. The compression mechanism 30 is located on the inner circumferential side of the fixed tube 51, and includes a support pin 31 to support the elastic member 11, and a coil spring 32 to compress the elastic member 11 in the direction of the flat portion 40a of the rotary element 40B.

As shown in FIG. 4, a frame 57 supports a focal distance adjustment lens group L52. The frame 57 is formed with parallel through holes 57a, 57b (through hole 57b is superposed on through hole 57a and therefore not shown in the figure) in the optical axis direction and with a flat portion 57c in a portion of an outer circumference of the frame 57. A linear guide 58 is inserted into the through holes 57a, 57b. The linear guide 58 is arranged parallel to the optical axis and is fixed to the fixed tubes 51 and 53. Moreover, a linear type of ultrasonic actuator 10-1 is arranged in a position facing the flat portion 57c of the frame 57. A compression mechanism 30-1 causes compressive contact between the ultrasonic actuator 10-1 and the flat portion 57c. The ultrasonic actuator 10-1 is substantially the same as the ultrasonic actuator 10. Further, the compression mechanism 30-1 is substantially the same as the compression mechanism 30.

As described above, when the ultrasonic actuator 10 is operated, the ultrasonic actuator 10 generates an elliptical motion in the drive force output portions 11a11d. As a result, drive force is applied from the drive force output portions 11a–11d to the rotary element 40B, for example, as shown by the arrow F in FIG. 1, to cause the rotary element 40B to rotate around the optical axis. As shown in FIG. 4, the rotary motion of the rotary element 40B is transmitted to the frame 56 via the key groove 52a and the key 56a, and, as a result of the transmission of the rotary motion of the rotary element 40B, the frame 56 rotates around the optical axis. Furthermore, the rotary motion of the frame 56 is converted by the helicoid 59 into a rectilinear motion in the optical axis direction. Accordingly, the frame 56 and the focus adjustment lens group L51 supported by the frame 56 move rectilinearly in the optical axis direction while rotating. As a result, focus adjustment of the optical system is performed.

In operation of the ultrasonic actuator 10-1, the drive force generated by the ultrasonic actuator 10-1 is transmitted directly to the frame 57, and a force is applied to the frame 57 in the optical axis direction. As a result of the force applied to the frame 57, the frame 57 and the focal distance adjustment lens group L52 move in the optical axis direction guided by the linear guide 58 to perform adjustment of the focal distance.

In the above-described manner, in accordance with the present preferred embodiment, a rotary drive force is applied to the rotary element 40B using a linear type of ultrasonic actuator 10. Moreover, the rotary motion of the rotary element 40B is used to drive the focus adjustment lens group L51 after it has been converted into a rectilinear motion in the optical axis direction by the helicoid 59. Therefore, in accordance with the present preferred embodiment of the invention, the position setting accuracy of the focus adjustment lens group L51 in the optical axis direction is chiefly determined by the characteristics of the helicoid 59. In other words, by suitably configuring the helicoid 59, it is possible to increase the position setting accuracy of the focus adjustment lens group L51 and to perform highly accurate focus adjustment.

Moreover, in accordance with the present preferred embodiment of the invention, as shown in FIG. 4, since the ultrasonic actuator 10 comes into contact with only a portion of the rotary element 40B, an advantage of this arrangement is that not too strict a flatness of the flat portion 40a is required. Generally, ultrasonic motors and the like vibration actuators require strict flatness with respect to the moving element which performs relative motion (e.g., a rotary element) making frictional contact with the vibration element because the amplitude of the vibration which arises in the vibration element is of micron order. However, the strictness of the requirement with respect to flatness increases together with an increase in the contact surface area of the vibration element and the moving element.

Accordingly, when an annular type of ultrasonic motor is used, as in the lens barrel provisionally disclosed in Japanese Laid-open Patent Application No. JP-A-59-111117, because the ultrasonic motor and the rotary element come in contact over the whole circumference of the rotary element, the flatness requirement becomes very strict with respect to the rotary element. In contrast, in accordance with the present preferred embodiment of the invention, which utilizes a linear type of ultrasonic actuator, since contact with only a portion of the rotary element 40B occurs, it is sufficient if the flatness of the rotary element 40B is insured in a comparatively narrow region corresponding to the length of the ultrasonic actuator 10. Accordingly, as described hereinabove, the requirement of flatness with respect to the flat portion 40a of the rotary element 40B is comparatively lenient, and its manufacture becomes easy.

Furthermore, in accordance with the present preferred embodiment of the invention, an advantage occurs in that the compressive force per unit area applied to the ultrasonic actuator 10 is small since a linear type of ultrasonic actuator is used. More particularly, a smaller compressive force may be applied to a linear type of ultrasonic actuator 10, in comparison with an annular type of ultrasonic actuator, because the contact surface area with the rotary element is small. Consequently, in accordance with in the present preferred embodiment, it is not necessary to make the structure of the compression mechanism 30 of the ultrasonic actuator 10 or the peripheral members which support these members as solid as in the case in which an annular type of ultrasonic motor is used.

Moreover, in accordance with the present preferred embodiment, the rotary element 40B, frame 56 and helicoid 59 are similar to a prior art lens barrel in which an annular type of ultrasonic motor is used. Accordingly, the lens barrel of the present preferred embodiment has the advantage that it can be designed without major design changes to the existing lens barrel.

Second Preferred Embodiment of a Vibration Actuator Drive Device

Figure 6A:
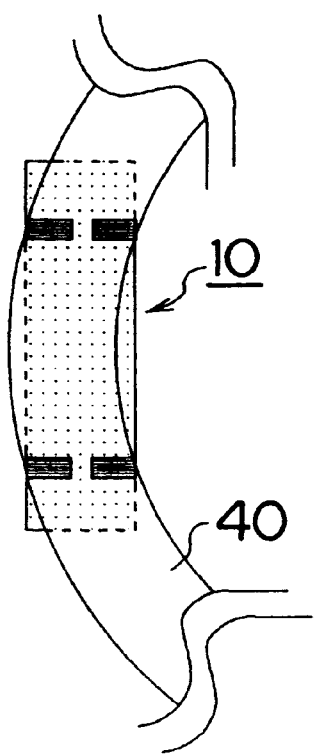
FIGS. 6(a)–6(b) illustrate a vibration actuator drive device in accordance with a second embodiment of the present invention.
Figure 6B:
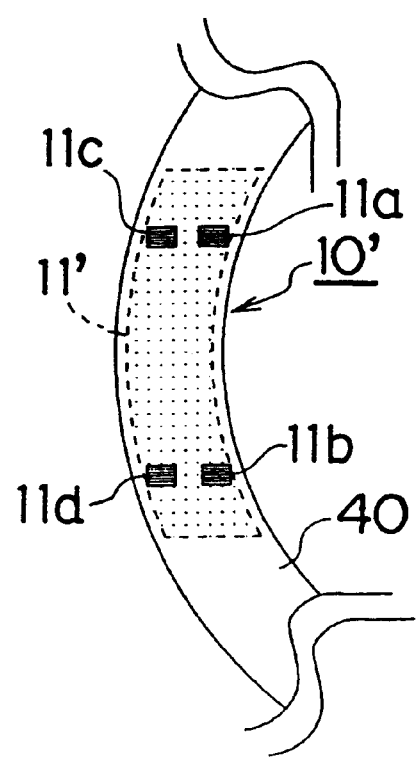

FIGS. 6(*a*) and 6(*b*) are diagrams illustrating a vibration actuator drive device in accordance with a second preferred embodiment of the present invention. As shown in FIG. 6(*a*), a linear type of ultrasonic actuator 10 has a rectangular body configuration, similar to the embodiment shown in FIG. 1, and the ultrasonic actuator 10 is arranged to face the rotary element 40. Further, as shown in FIG. 6(*a*), a portion of the ultrasonic actuator 10 protrudes from the rotary element 40 having an annular shape. However, since the motive force from the ultrasonic actuator 10 is transmitted to the rotary element 40 via the drive force output portions 11a–11d, if the drive force output portions 11a–11d are in a state capable of sliding with the rotary element 40, there is no operational inconvenience even if the drive force output portions 11a–11d project to the inner diameter side or outer diameter side of the rotary element 40. More particularly, the size, shape, etc., of the elastic member 11 are not limited by the shape of the rotary element 40, and it is possible for the design of the vibration actuator drive device to be comparatively free in a range in which a predetermined vibration is obtained.

As shown in FIG. 6(*b*), an elastic member 11' of an ultrasonic actuator 10' has a shape which follows the shape of the rotary element 40. Thus, the vibration actuator drive device can be freely designed with respect to size, shape, etc., in a range in which a predetermined elliptical motion is obtained in the drive force output portions 11a–11d. In the case of the ultrasonic actuator 10', the effect is obtained that, in a small form lens barrel, the ultrasonic actuator 10' can be arranged such that the reduction of size of the lens barrel is not an impediment for other members which are close to the inner circumferential side and outer circumferential side of the rotary element 40.

Third Through Seventh Preferred Embodiments of Vibration Actuator Drive Devices

FIGS. 7(*a*)–7(*f*) are diagrams illustrating vibration actuator drive devices in accordance third through seventh preferred embodiments of the present invention. FIG. 7(*a*1) and FIG. 7(*a*2) respectively illustrate the amplitude of the bending vibration and longitudinal vibration which arise in the elastic member 11 of the linear type of ultrasonic actuator 10. FIGS. 7(*b*)–7(*f*) illustrate arrangements of drive force output units which differ from those arrangements shown in FIG. 1. Furthermore, in FIGS. 7(*a*1) and 7(*a*2), the respective abscissas represent the amplitude of the bending vibration and longitudinal vibration. Moreover, the respective ordinates represent the position on the elastic member 11.

As shown in FIGS. 7(*b*)–7(*f*), the drive force output portions, which have sliding frictional contact with the relative motion member, are disposed in positions which are symmetrical in relation to the parallel and perpendicular center lines with respect to the relative motion direction (direction of advance) of the relative motion member. In other words, the drive force output portions are disposed symmetrically relative to the center lines of the elastic member 11 length and elastic member 11 width. However, when the ultrasonic actuator 10 generates a relative motion having a curved-line (non-straight line) locus, the circumferential speeds of the inner circumferential side and outer circumferential side of the curved-line locus differ. Because of the difference in the inner and outer circumferential speeds, slippage arises in the relative motion member 40 (e.g., rotary element) in places where the circumferential speed is large when the drive force transmitted from the ultrasonic actuator 10 is the same at various points, and loss of energy arises.

For example, in the ultrasonic actuator 10 shown in FIG. 1, the drive force output portions 11a and 11c contact the rotary element 40 at positions which differ relative to the diameter direction of the rotary element 40. Accordingly, when the rotary element 40 has rotated, the distance of relative motion which the drive force output portion 11a generates with respect to the rotary element 40 is smaller than the distance of relative motion which the drive force output portion 11c generates with respect to the rotary element 40.

On the other hand, the positions at which the drive force output portions 11a and 11c are disposed with respect to the elastic member 11 are equal positions relative to the direction of the longitudinal vibration arising in the elastic member 11. Accordingly, as is clear from FIGS. 7(*a*1) and 7(*a*2), in the case of FIG. 1, the amplitude of the longitudinal vibration (or bending vibration) arising in the drive force output portion 11a is equal to the amplitude of the longitudinal vibration (or bending vibration) arising in the drive force output portion 11c. That is, regardless of the difference in the circumferential speed of the inner circumferential side and the outer circumferential side of the rotary element 40, the vibration actuator 10 applies the same drive force (circumferential speed) to the rotary element 40. Because of this, slip arises between either one or both of the drive force output portion 11a and the drive force output portion 11c and the rotary element 40 which is driven in rotation. The slip between the drive force output portions 11a, 11c and the rotary element 40 is an operational inconvenience, and is a primary factor in causing the reduction of the transmission efficiency of the drive force to the rotary element 40 from the ultrasonic actuator 10. The slip occurs similarly for the drive force output portion 11b and the drive force output portion 11d.

Consequently, the embodiments of the invention shown in FIG. 7 operate to adjust the drive force (speed, etc.) which the ultrasonic actuator 10 transmits to the relative motion member 40 (rotary element 40). The adjustment of the drive force according to the position of the relative motion member 40 causes an increase or decrease of the drive force transmitted from the ultrasonic actuator 10. The adjustment of the drive force may be effected by adjusting the positions, shapes, numbers, etc., of the drive force output portions 11

As shown in FIG. 7(a2), the amplitude of the longitudinal vibration arising in the elastic member 11 is small at the center portion of the elastic member 11, and larger moving toward the ends of the elastic member 11. Consequently, in the ultrasonic actuator 10B shown in FIG. 7(b), the drive force output portion 11a' and the drive force output portion 11b' are arranged in the center portion side of the elastic member 11, and the drive force output portion 11c' and the drive force output portion 11d' are arranged in the end portion side of the elastic member 11. The longitudinal vibration amplitudes of the respective drive force output portions 11a'–11d' agree with the relative motion amount of the rotary element 40. More specifically, the amplitude of the longitudinal vibration arising in each drive force output portion 11a'–11d' corresponds to the distance from the optical axis (center of rotation) of the respective positions in which the drive force output portions 11a'–11d' are arranged. In other words, the arrangement of the drive force output portion with respect to the elastic member 11 is set to correspond to the circumferential speed of the rotary element 40 in the position in which the respective drive force output portion transmits drive force. Accordingly, in the ultrasonic actuator 10B shown in FIG. 7(b), slip does not arise between the respective drive force output portions 11a'–11d' and the rotary element 40. Furthermore, as shown in FIG. 7(a1), the bending vibration amplitude of the respective drive force output portions 11a'–11d' also agrees well with the relative motion amount of the rotary element 40.

Moreover, in the ultrasonic actuator 10C shown in FIG. 7(c), the drive force output portions 11c, 11f are disposed obliquely with respect to the direction of the longitudinal vibration and the amplitude of vibration is small at the inner circumferential side end portion of the respective drive output portions 11e, 11f, and the amplitude becomes large at the outer circumferential side end portion of the drive force output portion. Accordingly, in the case of the ultrasonic actuator 10C, slip does not arise between the respective drive force output portions 11e, 11f and the rotary element 40. In FIG. 7(b) and 7(c), the respective positions of the drive force output portions coming into contact with the inner circumferential side and outer circumferential side of the rotary element 40 change. Thus, the ultrasonic actuators 10B and 10C adjust the position of the drive force output portions according to the vibration amplitudes of the bending mode (standing wave) which arise in the ultrasonic actuators 10B, 10C.

As shown in FIG. 7(d), the ultrasonic actuator 10D includes two drive force output portions 11g, 11h having a narrow width disposed at equal positions relative to the diameter direction of the rotary element 40. Accordingly, unlike the case of the above-described ultrasonic actuators, the problem of slip between the drive force output portions 11g, 11h and the rotary element 40 did not arise to begin with in the ultrasonic actuator 10D.

FIG. 7(e) illustrates an ultrasonic actuator 10E, having a number of drive force output portions 11i–11k in respective positions contacting the inner circumferential side and the outer circumferential side of the rotary element 40. Specifically, one drive force output portion 11i is located on the inner circumferential side of the rotary element 40 and two drive force output portions 11j, 11k are disposed on the outer circumferential side of the rotary element 40.

FIG. 7(f) illustrates an ultrasonic actuator 10F having drive force output portions 11m, 11n near to the side of the rotary element 40 (inner circumferential side) with the fast peripheral speed.

As described above, in accordance with the embodiments of the invention shown in FIG. 7, because the amplitude of vibration of the ultrasonic actuators differs according to the position of the elastic member 11, the amplitude (drive force) amount can be adjusted by adjusting the position or shape of the drive force output portions. Furthermore, because the drive force is adjusted using plural drive force output portions, by combining the magnitude of the peripheral speed of each point of the relative motion member, the drive force can be extracted. Then, by adjusting so as to equalize the ratio of the large or small relationship of peripheral speeds and the ratio of drive force which is extracted from the ultrasonic actuator, the slip or energy loss can be made small.

Eighth Preferred Embodiment of a Vibration Actuator Drive Device

Figure 8A:
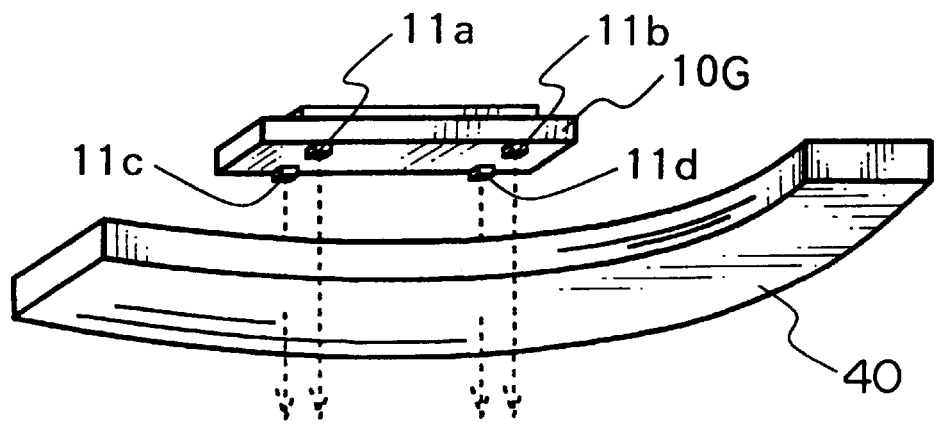
FIG. 8(a) is an oblique view of a vibration actuator drive device in accordance with an eighth embodiment of the present invention.
Figure 8B:
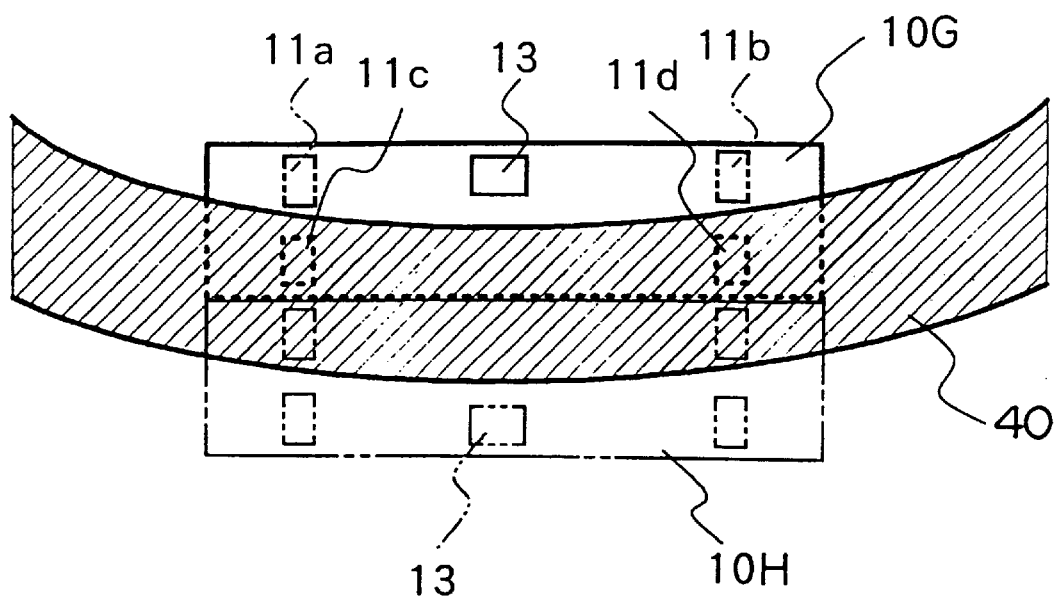
FIG. 8(b) is a rear view of the vibration actuator in accordance with the eighth embodiment of the present invention.

FIGS. 8(a) and 8(b) illustrate a vibration actuator drive device in accordance with an eighth embodiment of the present invention. As shown in FIGS. 8(a) and 8(b), an ultrasonic actuator 10G is in compressive contact with the rotary element 40 at only one side in the width direction due to the difference of the peripheral speeds of the inner circumferential side and the outer circumferential side of the rotary element 40. Accordingly, slip of the drive force output portions 11a–11d (sliding members) and the rotary element 40 can be decreased. In accordance with the embodiment shown in FIG. 8(a) only the inner circumferential side of the rotary element 40 is in compressive contact with the drive force output portions 11c, 11d of the elastic member 11. However, as shown in FIG. 8(b), the ultrasonic actuator 10H may have only the outer circumferential side of the rotary element 40 in compressive contact with the drive force output portions 11a, 11b. In the case that only the inner circumferential side of the rotary element 40 is in compressive contact with the drive force output portions, the drive force becomes large. In the case that only the outer circumferential side of the rotary element 40 is in compressive contact with the drive force output portions, the speed becomes fast. Accordingly, a suitable combination of contacting the inner and outer circumferential side can be properly used (or switched). Furthermore, in the case of fixed use of contact on the inner circumferential side or outer circumferential side of the rotary element 40, the drive force output portion (sliding member) on the side which does not come into contact can be omitted. Moreover, if a support member 13 is disposed in the center portion, or the like, of the omitted side, support is easily provided.

Ninth and Tenth Preferred Embodiments of a Vibration Actuator Drive Device

Figure 9A:
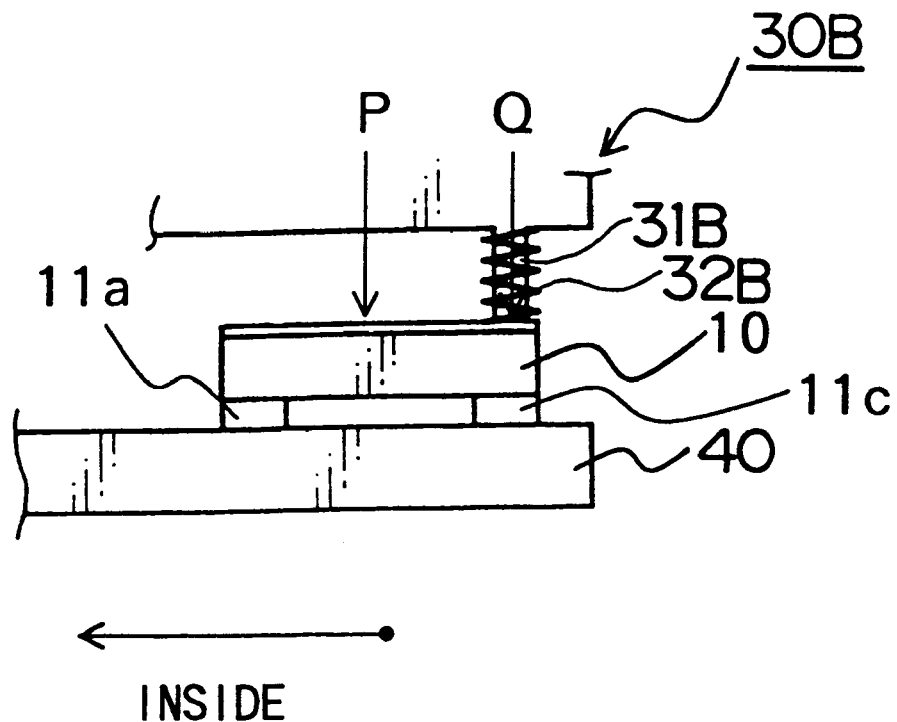
FIGS. 9(a) and 9(b) illustrate a vibration actuator drive device in accordance with ninth and tenth embodiments of the present invention.
Figure 9B:
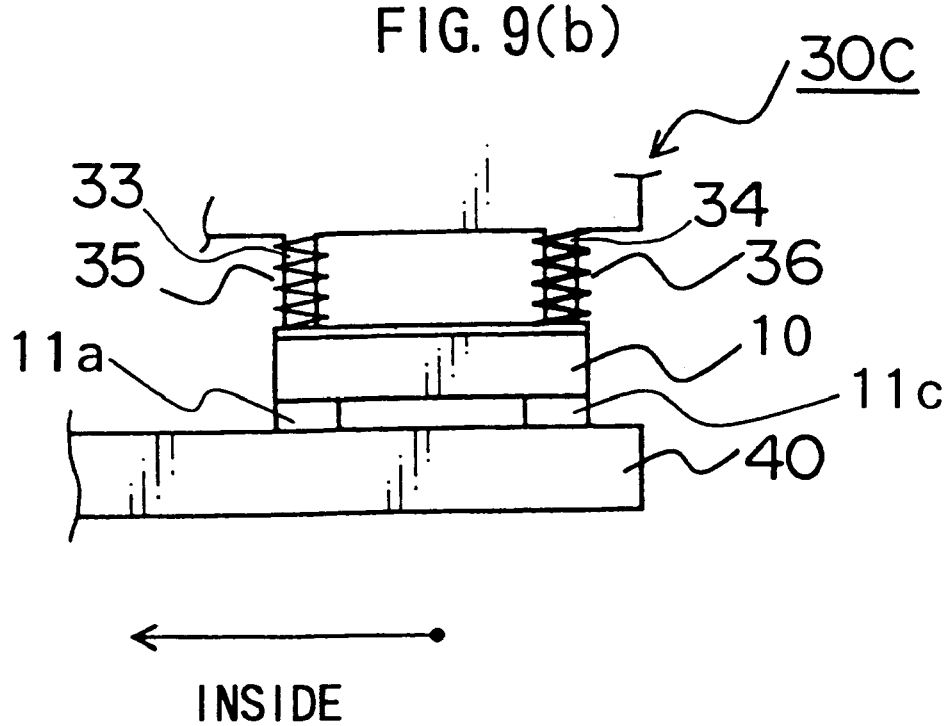

FIGS. 9(*a*) and 9(*b*) illustrate a vibration actuator drive device in accordance with ninth and tenth embodiments of the present invention. As shown in FIG. 9(*a*), compression mechanism 30B causes compressive contact with the relative motion member 40 (rotary element) at an compression point P which is at an intersection point of the center line of the ultrasonic actuator 10. The ultrasonic actuator 10 transmits drive force as a result of the compressive contact with the rotary element 40. Consequently, in accordance with the ninth embodiment of the invention shown in FIG. 9(*a*), the position of the compression point (Q) which compresses the ultrasonic actuator 10 and the rotary element 40, (i.e., the position of a pin 31B and a spring 32B) is changed to the outer circumferential side at the rotary element 40. Specifically, by compressing the position (Q) one-sidedly at a large peripheral speed, it is possible to perform transmission of drive force according to the difference of peripheral speed. Furthermore, as shown in FIG. 9(*b*), in accordance with a tenth embodiment of the invention a compression mechanism 30C comprising pins 33, 34 and springs 35, 36 provides compression at two points, such as an outer side and an inner side of the vibration actuator 10. The strength of the springs 35, 36 may be such that, e.g., the compression force on the outer side becomes strong, and the peripheral speeds become equal.

Eleventh Preferred Embodiment of Vibration Actuator Drive Device

Figure 10:
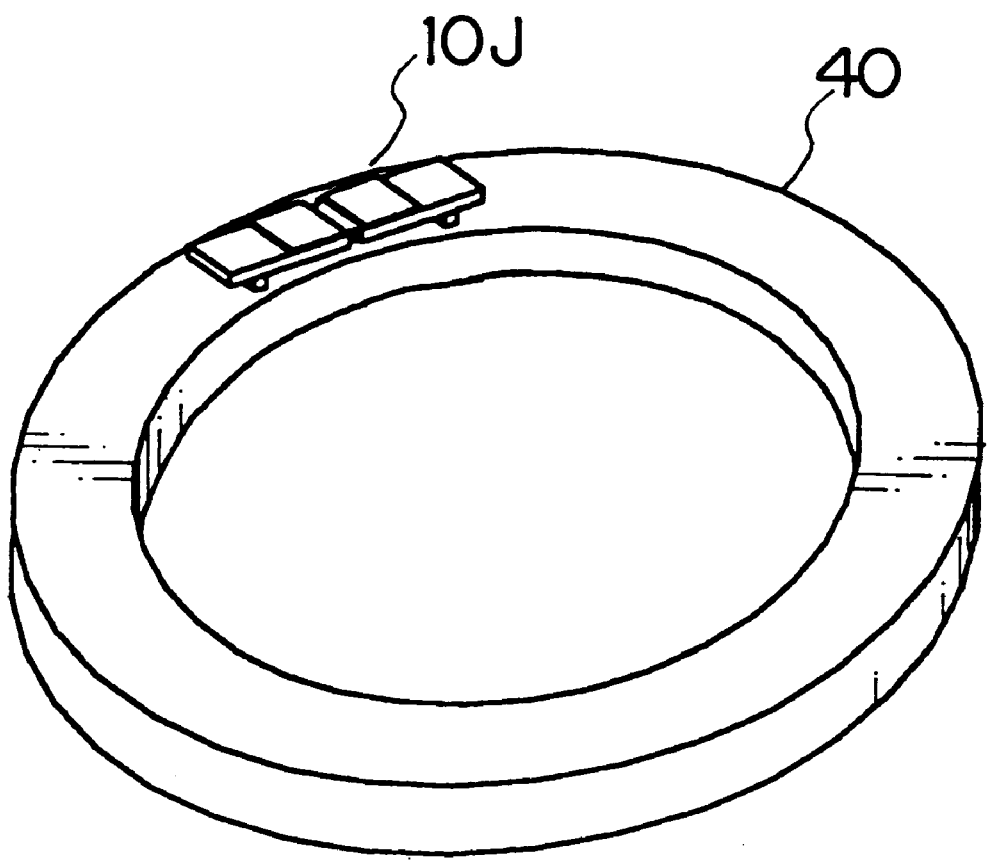
FIG. 10 is an oblique view of a vibration actuator drive device in accordance with an eleventh embodiment of the present invention.

FIG. 10 is an oblique diagram of a vibration actuator drive device in accordance with an eleventh embodiment of the present invention. FIGS. 11(*a*)–11(*c*) illustrate the vibration actuator of the vibration actuator drive device in accordance with the eleventh embodiment of the present invention. As shown in FIG. 10, the vibration actuator drive device includes the rotary element 40, and an ultrasonic actuator 10J in compressive contact with the rotary element 40. As shown in FIGS. 11(*a*)–11(*c*), the ultrasonic actuator 10J includes drive force output portions 14-1, 14-2, 15-1, 15-2 in four places corresponding to antinodes of the bending vibration. The speed in the direction of the tangent to the circumference in the positions of the drive force output portions 14-1, 14-2, 15-1, 15-2 is different from that in the diameter direction of the rotary element 40. Specifically, at the position of the diameter direction inner side drive force output portions 14-1, 15-1, the speed in the tangential direction is slow. At the position of the diameter direction outer side drive force output portions 14-2, 15-2, the speed in the tangential direction is fast.

Consequently, the inner circumferential side drive force output portions 14-1, 15-1 of the ultrasonic actuator 10J in accordance with the eleventh embodiment of the invention comprises polyacetal and the like low friction materials. The outer circumferential side drive force output portions 14-2, 15-2 comprise polyflon and the like high friction materials. Because of this arrangement, the drive force is chiefly transmitted by the drive force output portions 14-2, 15-2 of the outer circumferential side, and the drive force output portions 14-1, 15-1 of the inner circumferential side are in a slipping state. Further, because the drive force output portions 14-1, 15-1 of the inner circumferential side comprise low friction material, there is no generation of sound or heat. Moreover, because having a magnitude in the diameter direction also, stabilized frictional contact of the rotary element 40 and the ultrasonic actuator 10J is possible. Therefore, in accordance with the eleventh preferred embodiment of the present invention, stabilized frictional contact can be made without generating sound and heat at the sliding surfaces of the ultrasonic actuator 10J and the rotary element 40.

Twelfth Preferred Embodiment of a Vibration Actuator Drive Device

Figure 12:
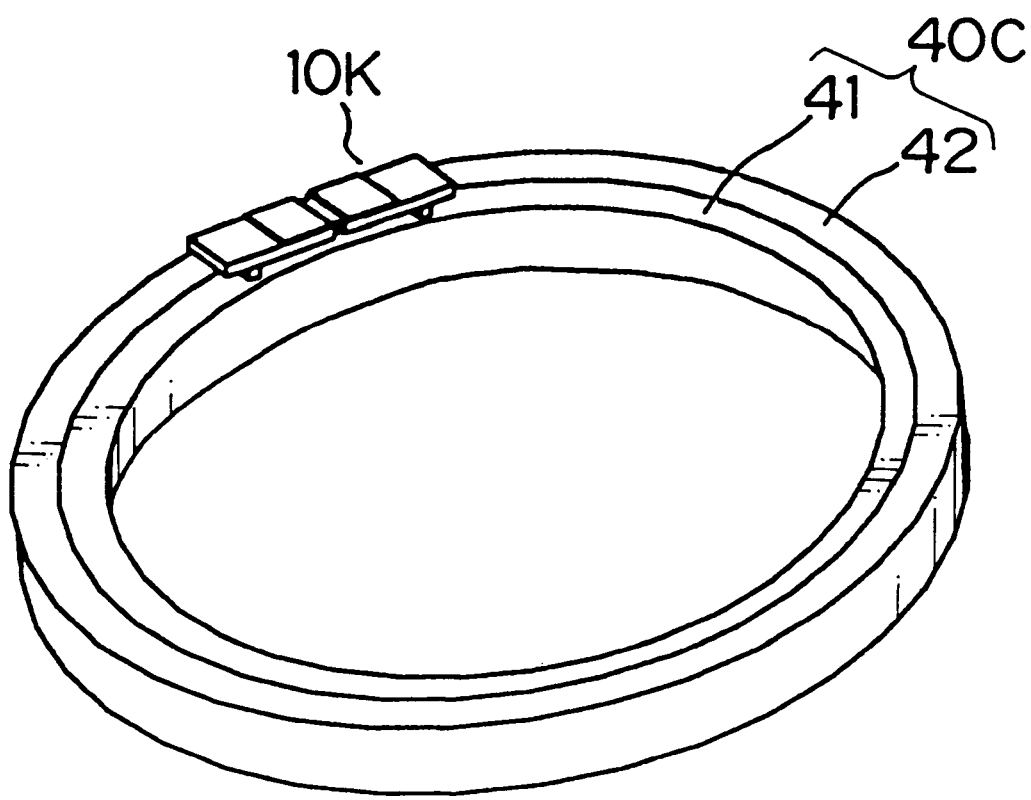
FIG. 12 is an oblique view of a vibration actuator drive device in accordance with a twelfth embodiment of the present invention.

FIG. 12 is an oblique diagram of a twelfth preferred embodiment of a vibration actuator drive device in accordance with a twelfth embodiment of the present invention. In accordance with the twelfth embodiment, the drive output portions 14-1, 14-2, 15-1, 15-2 (not shown in the figure) of the ultrasonic actuator 10K comprise the same material; however, the rotary element 40C comprises different materials on the inner circumferential side and the outer circumferential side. Specifically, the rotary element 40C is provided with an inside rotary portion 41 comprising a low friction material and an outside rotary portion 42 comprising a high friction material. In accordance with this arrangement, the drive force is transmitted chiefly by the outer rotary portion 42, and the inner rotary portion 41 is in a slipping state. The inner rotary portion 41 does not generate sound or heat because it is made of low friction material. Moreover, because the inner rotary portion 41 has a size in the diameter direction, the rotary element 40C is capable of a stable frictional contact with the vibration actuator 10K. As a result, in accordance with the twelfth embodiment of the present invention there is no generation of sound or heat at the sliding surfaces of the ultrasonic actuator 10K and the rotary element 40C, and stable frictional contact is possible.

Thirteenth Preferred Embodiment of a Vibration Actuator Drive Device

Figure 13:
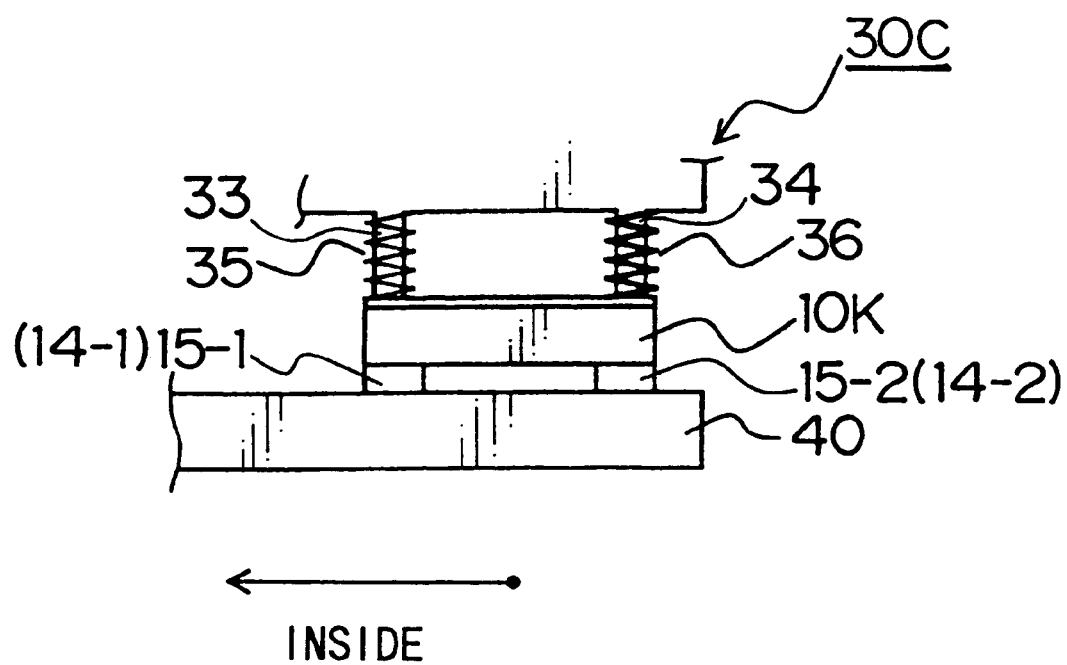
FIG. 13 illustrates a vibration actuator drive device in accordance with a thirteenth embodiment of the present invention.

FIG. 13 is a diagram illustrating a vibration actuator drive device in accordance with a thirteenth preferred embodiment of the present invention. As shown in FIG. 13, the rotary element 40 is the same as in the eleventh preferred embodiment, and the ultrasonic actuator 10K is the same as that used in the twelfth preferred embodiment of the invention. However, the compression member 30C includes an inner coil spring 35 having a weak compressive force mounted on the inner side pin 33, and an outer coil spring 36 having strong compressive force mounted on the outer side pin 34. In accordance with the thirteenth preferred embodiment, drive force is transmitted chiefly by the drive force output portions 14-2, 15-2 of the outer circumferential side, and the drive force output portions 14-1, 15-1 of the inner circumferential side are in a slipping state. Further, the inner circumferential side drive force output portions 14-1, 15-1 do not generate sound and heat, because the compressive force is weak. Moreover, because the rotary element 40 has a size in the diameter direction, the rotary element 40 is capable of stable frictional contact with the vibration actuator 10K. Therefore, in accordance with the thirteenth embodiment of the present invention, there is no generation of sound or heat at the sliding surfaces of the ultrasonic actuator 10K and the rotary element 40, and stable frictional contact is possible.

Fourteenth Preferred Embodiment of a Vibration Actuator Drive Device

Figure 14:
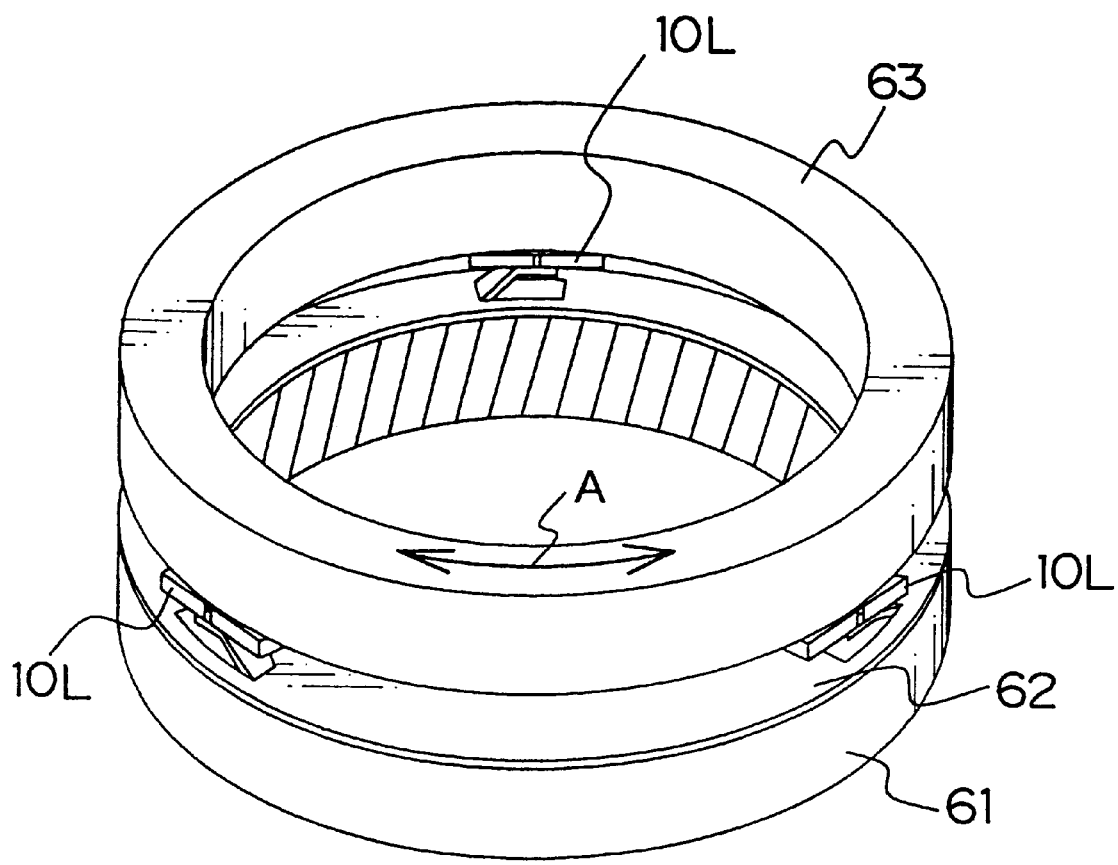
FIG. 14 is an oblique view of a vibration actuator drive device in accordance with a fourteenth embodiment of the present invention.
Figure 15:
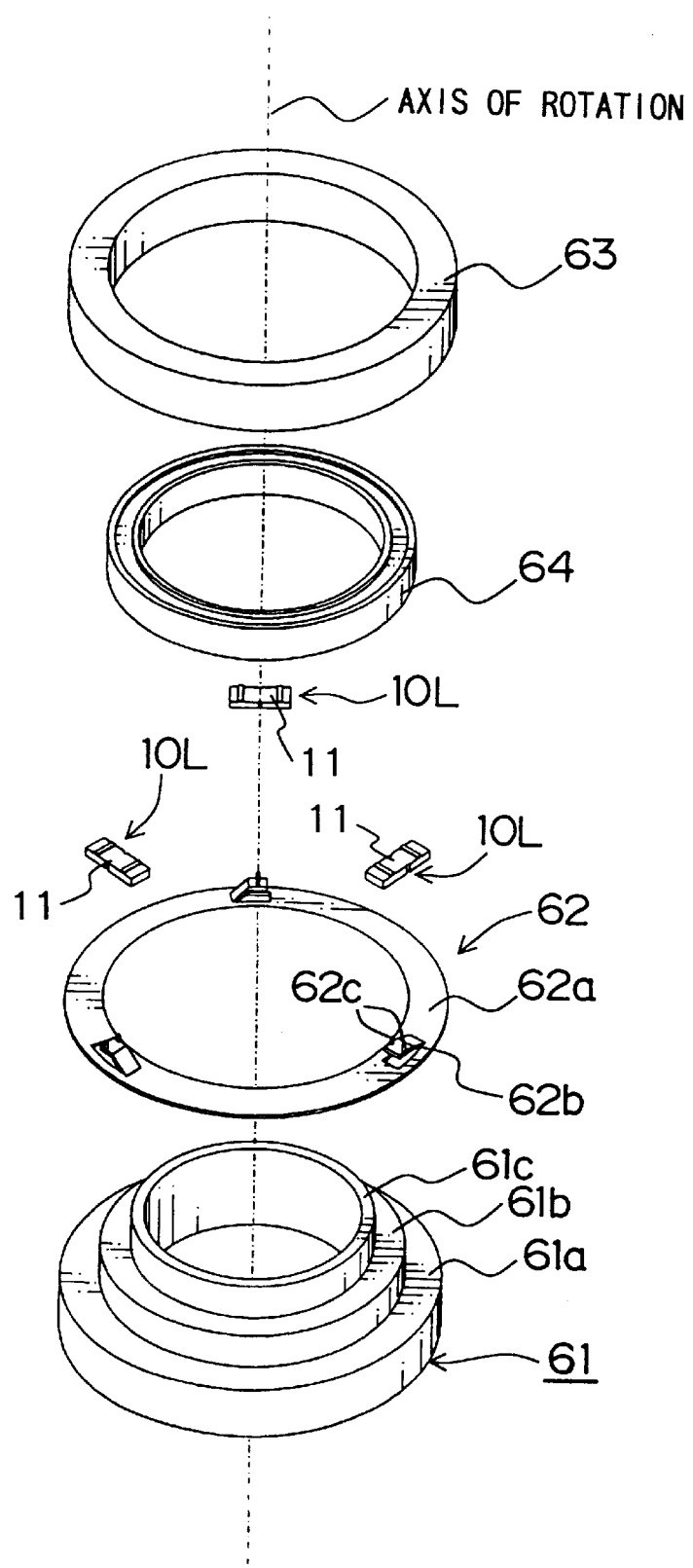
FIG. 15 is an exploded oblique view of the components of the vibration actuator drive device in accordance with the fourteenth embodiment of the present invention.
Figure 16:
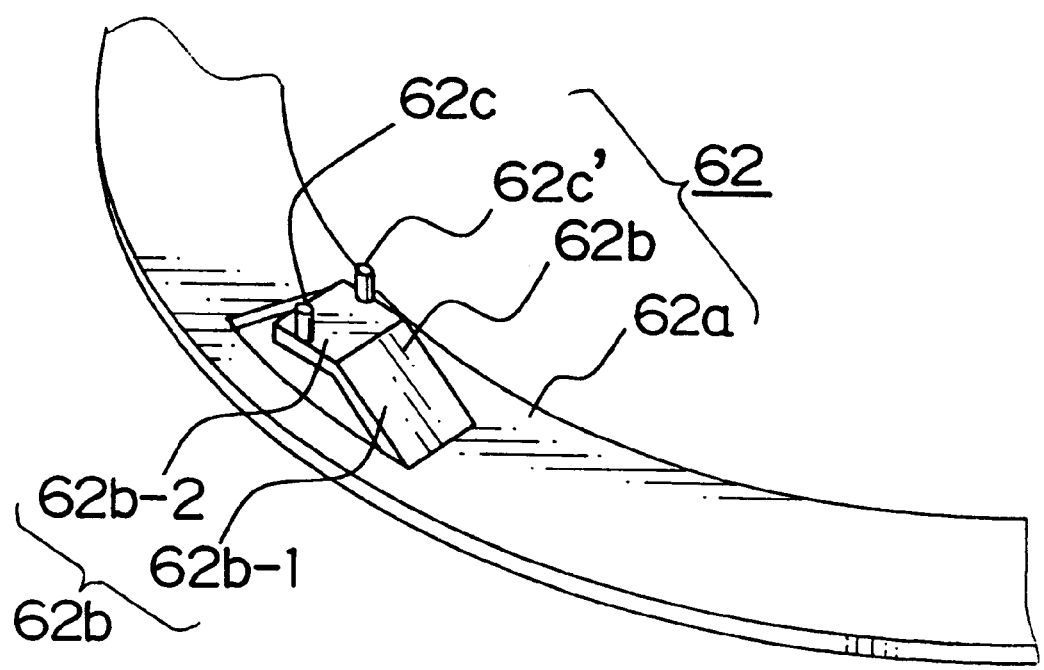
FIG. 16 is an oblique view of a compression support member in accordance with the fourteenth embodiment of the present invention.

FIGS. 14–16 illustrate a vibration actuator drive device in accordance with a fourteenth preferred embodiment of the present invention. More particularly, FIG. 14 is an oblique view of the entire vibration actuator drive device; FIG. 15 is an oblique, exploded view of the components of the vibration actuator drive device shown in FIG. 14; and FIG. 16 is an oblique view of a compression support member in accordance with the fourteenth embodiment of the invention. Furthermore, to facilitate understanding, the vibration actuator drive device illustrated in FIG. 14 is shown in a state with some of the components omitted. The vibration actuator drive device in accordance with the fourteenth embodiment of the invention includes a base member 61, a compression support member 62, a relative motion member 63, a bearing 64, and three ultrasonic actuators 10L. The ultrasonic actuators 10L are mounted on the base member 61. As shown in FIG. 15, the base member has a large diameter first ring unit 61a, a medium diameter second ring unit 61b, and a small diameter third ring unit 61c. Further, the three ultrasonic actuators 10L are arranged at about equal mutual spacings with respect to the base member 61.

The compression support member 62 supports each ultrasonic actuator 10L and is a member which compresses the ultrasonic actuator 10L against the relative motion member 63. The compression support member 62, as selectively shown in FIG. 16, includes a ring unit mounted on the first ring unit 61a of the base member 61. Plate spring units 62b are provided at three places on the compression support member 62. The plate spring units 62b include spring units 62b-1 comprising a cantilevered spring formed partially in a rectangular shape and with an inclined bent portion, a flat mounting portion 62b-2 connected to the spring unit 62b-1, and two support pins 62c, 62c' disposed on the mounting portion 62b-2 of the plate spring unit 62b.

The relative motion member 63 contacts each ultrasonic actuator 10L, and moves in relative motion with respect to the ultrasonic actuators 10L. In accordance with the fourteenth embodiment of the invention, the relative motion member 63 is a ring-shaped driven member. The bearing 64 is used to mount the relative motion member 63 for free rotation on the base member 61, and is inserted in the second ring member 61b of the base member 61, and supports the relative motion member 63 in its outer circumference. The ultrasonic actuator 10L is placed in compressive contact with the relative motion member 63 by the compression support member 62 which contacts the relative motion member 63 in a compressed state, and generates drive force. Moreover, the ultrasonic actuator 10L is supported in a state set in position by support pins 62c, 62c' of the compression support member 62.

Figure 17:
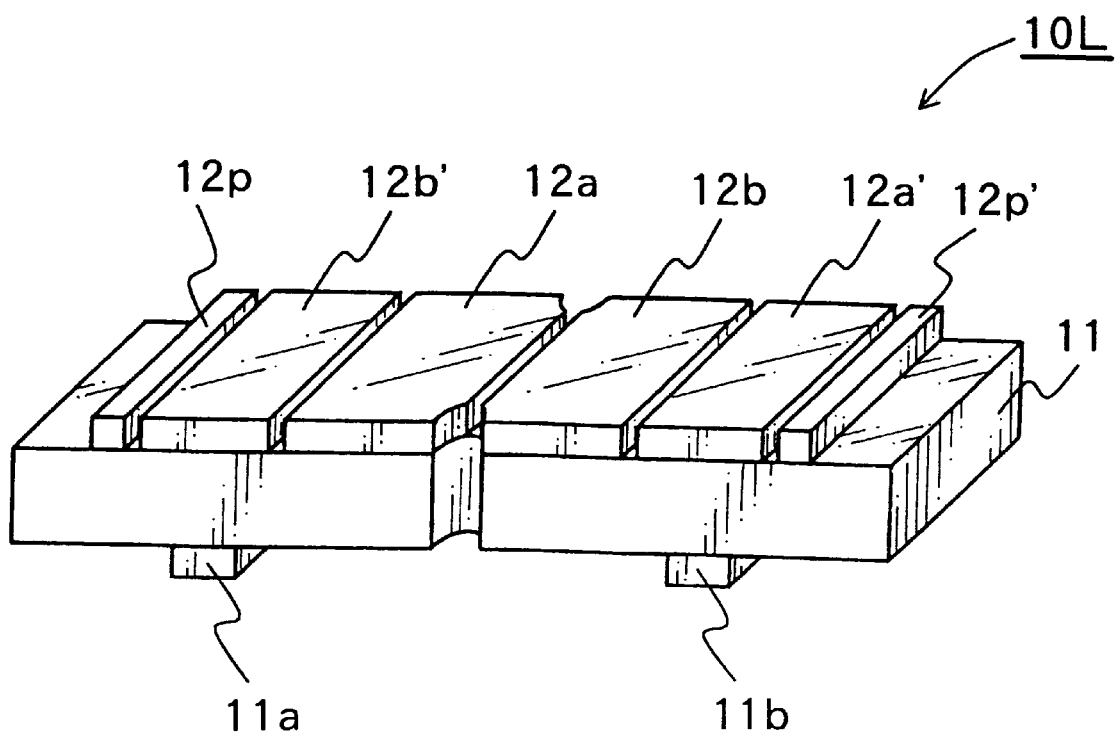
FIG. 17 is an oblique view of an ultrasonic actuator used in the vibration actuator drive device in accordance with the fourteenth embodiment of the present invention.

The structure of the ultrasonic actuator 10L and the principle of driving the relative motion member 63 will now be described below with respect to FIG. 17. FIG. 17 is an oblique diagram of an ultrasonic actuator 10L used in the vibration actuator drive device in accordance with the fourteenth embodiment of the present invention. The ultrasonic actuator 10L comprises a rectangular flat elastic member 11, and six piezoelectric elements 12a, 12a', 12b, 12b', 12p, 12p' adhered to the elastic member 11. Projecting drive force output portions 11a, 11b are formed in the elastic member 11. The drive force output portions 11a, 11b transmit drive force to the relative motion member 63 while in compressive contact with the relative motion member 63. The drive force output portions 11a, 11b are disposed at positions of antinodes of the bending vibration which is generated in the elastic member 11. The drive force output portions 11a, 11b may be formed in the whole or in a portion of the elastic member 11, and are formed by adhering sliding members comprising plastic, or the like, having wear resistant characteristics. The piezoelectric elements 12a, 12a', 12b, 12b' are piezoelectric elements for driving. A first alternating voltage is applied to the piezoelectric elements 12a, 12a', and a second alternating voltage, having a different phase, is applied to the piezoelectric elements 12b, 12b'. Thus, in accordance with the piezoelectric effect of the piezoelectric elements 12a 12a', 12b, 12b', a first order longitudinal vibration and a fourth order bending vibration are generated in the elastic member 11. The longitudinal and bending vibrations cause elliptical motion to be generated in the drive force output portions 11a, 11b, and relative motion is generated between the relative motion member 63 and the elastic member 11. Moreover, the piezoelectric elements 12p, 12p' are used to monitor the state of vibration generated in the elastic member 11. Furthermore, the body of the elastic member 11 is connected to GND potential.

The ultrasonic actuators 10L have a first alternating voltage applied to the piezoelectric elements 12a, 12a', and a second alternating voltage applied to the piezoelectric elements 12b, 12b' from a drive circuit which is the same as the drive circuit shown in FIG. 3. The first and second alternating voltages are electrically different in phase by 90°, and, by the application of these two voltages, elliptical motion is generated in the front ends of the drive force output portions 11a and 11b of the elastic member 11. The vibration actuator drive device in accordance with the fourteenth embodiment of the present invention includes drive circuits disposed separately for each of the three ultrasonic actuators 10L. By generating drive force in the same direction in all the ultrasonic actuators 10L, the relative motion member 63 is driven to rotate around the rotation axis shown in FIG. 15.

In accordance with the fourteenth embodiment of the present invention described above, by using compression support members which combine support pins on plate springs, a small space is attained for mounting. Moreover, because members integrally perform compression and support, in addition to ease of assembly, the component cost can be decreased. Furthermore, because three plate springs 62b are disposed with respect to the relative motion member 63, the three ultrasonic actuators 10L become independent, capable of compressive support, and do not give rise to floating or tilting. In contrast to the strict requirements on flatness of the stator (elastic member) and rotor (relative motion member) of the annular type of ultrasonic actuator of the prior art, in accordance with the fourteenth embodiment of the present invention only the relative motion member 63 and the drive force output portions 11a, 11b of the ultrasonic actuator 10L require strict flatness, and the advantage is that the manufacturing cost can be reduced.

Fifteenth Preferred Embodiment of a Vibration Actuator Drive Device

Figure 18A:
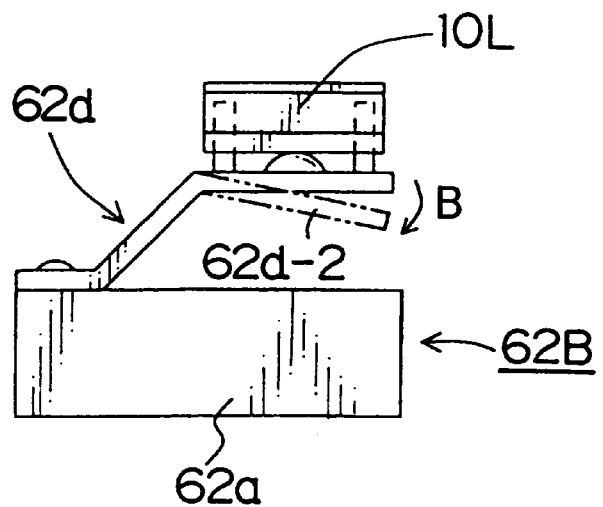
FIGS. 18(a) and 18(b) illustrate a compression support member of a vibration actuator drive device in accordance with a fifteenth embodiment of the present invention.
Figure 18B:
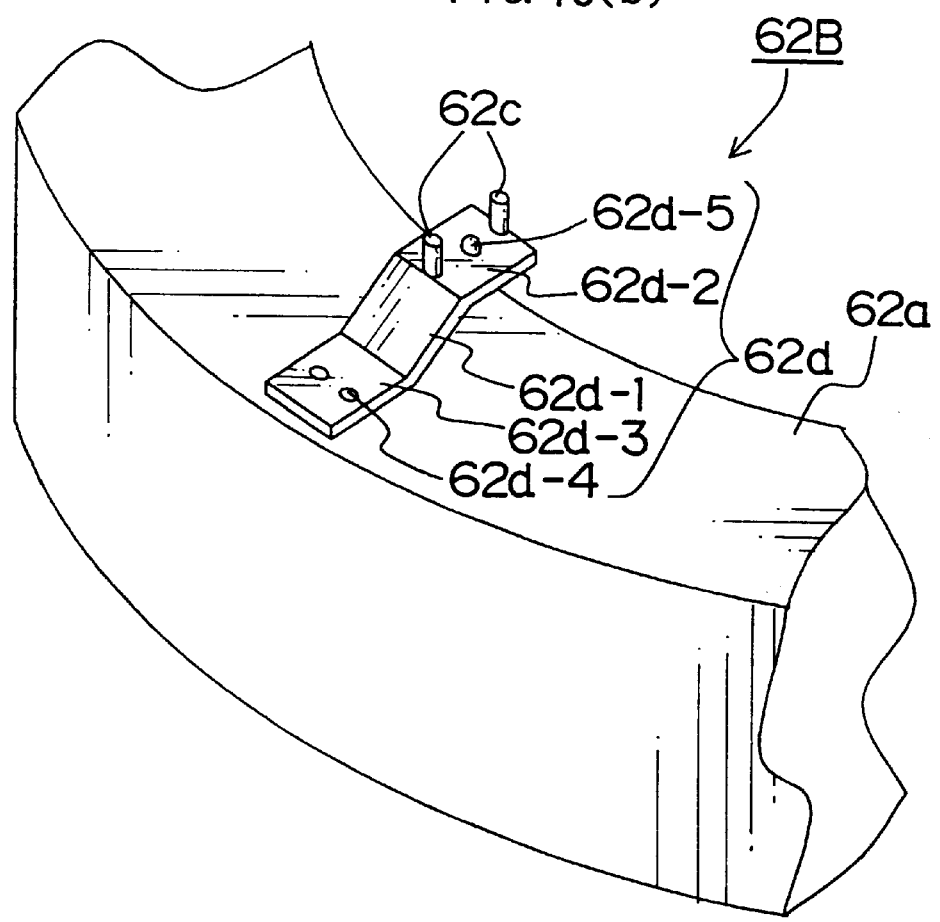

FIGS. 18(a) and 18(b) are schematic diagrams which selectively illustrate the compression support member of the vibration actuator drive device in accordance with a fifteenth embodiment of the present invention. In accordance with the fourteenth embodiment of the invention described above, a plate spring unit 62b has a bend in the circumferential direction. However, the plate spring unit 62B in accordance with the fifteenth embodiment of the invention includes a plate spring unit 62d having a bend direction in the diameter direction. Moreover, the plate spring unit 62d is disposed as a separate body from the ring unit 62a. The plate spring unit 62d includes a mounting unit 62d-2 connected at the front end side of the plate spring unit 62d, a base unit 62d-3 connected to the origin side of the plate spring unit 62d, a mounting member 62d-4 comprising a screw or the like which mounts the base unit 63d-3 to the ring unit 62a, and a check unit 62d-5 which is formed in the mounting unit 62d-2, and the like.

In accordance with the fifteenth embodiment of the invention, the mounting unit 62d-2 of the plate spring unit 62d, deforms in the direction of the arrow B, as shown by the double dot chain line of FIG. 18(a) and can adjust the compressive force in the width direction to the ultrasonic actuator 10L. Because of deforming of the mounting unit 62d-2, the speed difference of the inner circumferential side and the outer circumferential side of the relative speed (circumferential speed) of the relative motion member 63 and the ultrasonic actuator 10L can be suppressed by adjustment of the compressive force. More particularly, if the force relating to the outer circumferential side large circumferential speed becomes larger than at the inner circumferential side, the drive force transmitted at the outer circumferential side becomes larger than that at the inner circumferential side and the speed difference is eliminated.

In accordance with the fifteenth embodiment of the present invention, because the bend direction of the plate spring unit 62d is in the diameter direction, even if the relative motion member 63 rotates in either the right or the left direction, the compressive force acting between ultrasonic actuator 10L and the relative motion member 63 can be maintained at a constant value.

Sixteenth Preferred Embodiment of a Vibration Actuator Drive Device

FIGS. 19(a)–19(e) illustrate a vibration actuator drive device in accordance with a sixteenth embodiment of the present invention. In accordance the sixteenth embodiment of the invention, a hole (not a through hole) 11e is formed in about the central portion of the elastic member 11 of an ultrasonic actuator 10m. A support pin 62g of the compression support member 62C is fitted in the hole 11e. Furthermore, if necessary, a through hole may be disposed in a piezoelectric element 12.

The compression support member 62C includes a base unit 62 having a wall unit 62e-1, a plate spring unit 62f, one support pin 62g, and two check pins 62h which check the side surface of the elastic member 11, and the like. Since the elastic member 11 can rotate at only the support pin 62g', the check pins 62h contact the elastic member 11 from the side surface, to prevent this rotation. The check pins 62h preferably contact the elastic member 11 at the positions of nodes of the bending vibration generated in the elastic member 11. Furthermore, the compression support member 62C is connected to the GND potential, and also has the role of setting the elastic member 11 at GND potential.

Figure 19A:
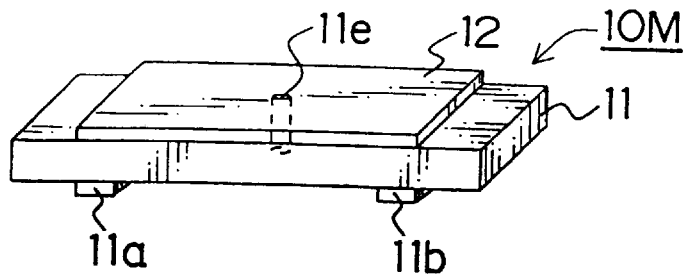
FIG. 19(a) is an oblique view of a vibration actuator in accordance with a sixteenth embodiment of the present invention.
Figure 19C:
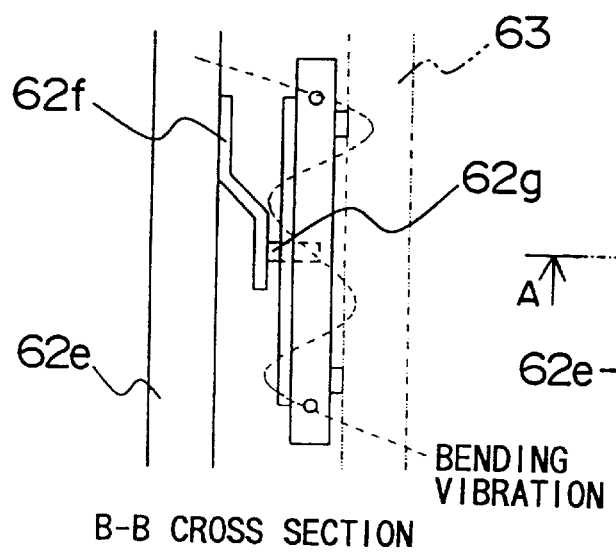
FIG. 19(c) is a section along line B—B of FIG. 19(b) in accordance with the sixteenth embodiment of the present invention.
Figure 19B:
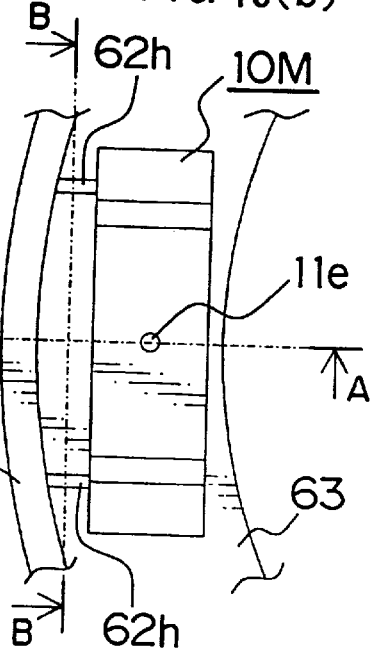
FIG. 19(b) illustrates a compression support member from the axis direction of the rotation adjacent to the vibration actuator in accordance with the sixteenth embodiment of the present invention.
Figure 19E:
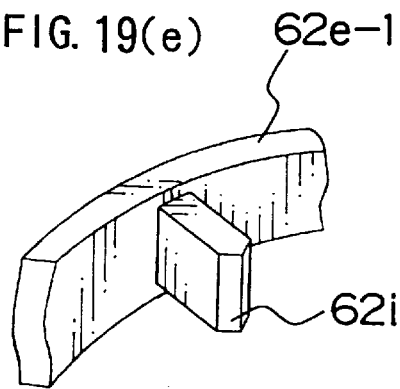
FIG. 19(e) is an oblique view of a portion of a modified compression support member in accordance with of the sixteenth embodiment of the present invention.
Figure 19D:
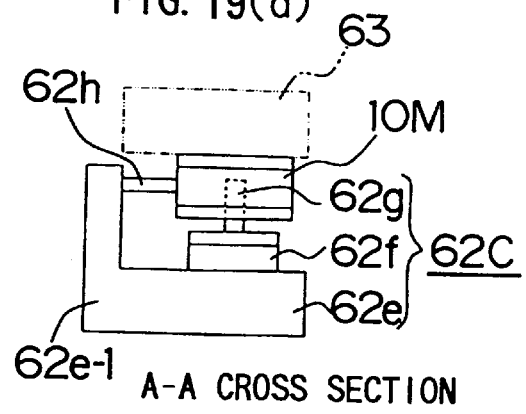
FIG. 19(d) is a section along line A—A in FIG. 19(b) in accordance with the sixteenth embodiment of the present invention.

Moreover, as shown in FIG. 19(e), a check member 62i is provided connected to the wall unit 62e-1 and having a width in the height direction, and having a wedge shape at a front end. The check member 62i contacts the elastic member 11. In accordance with the sixteenth embodiment of the present invention, the check pin 62h or check member 62i only makes contact singly with the elastic member 11, and does not fit into the elastic member 11.

Seventeenth Preferred Embodiment

Figure 20:
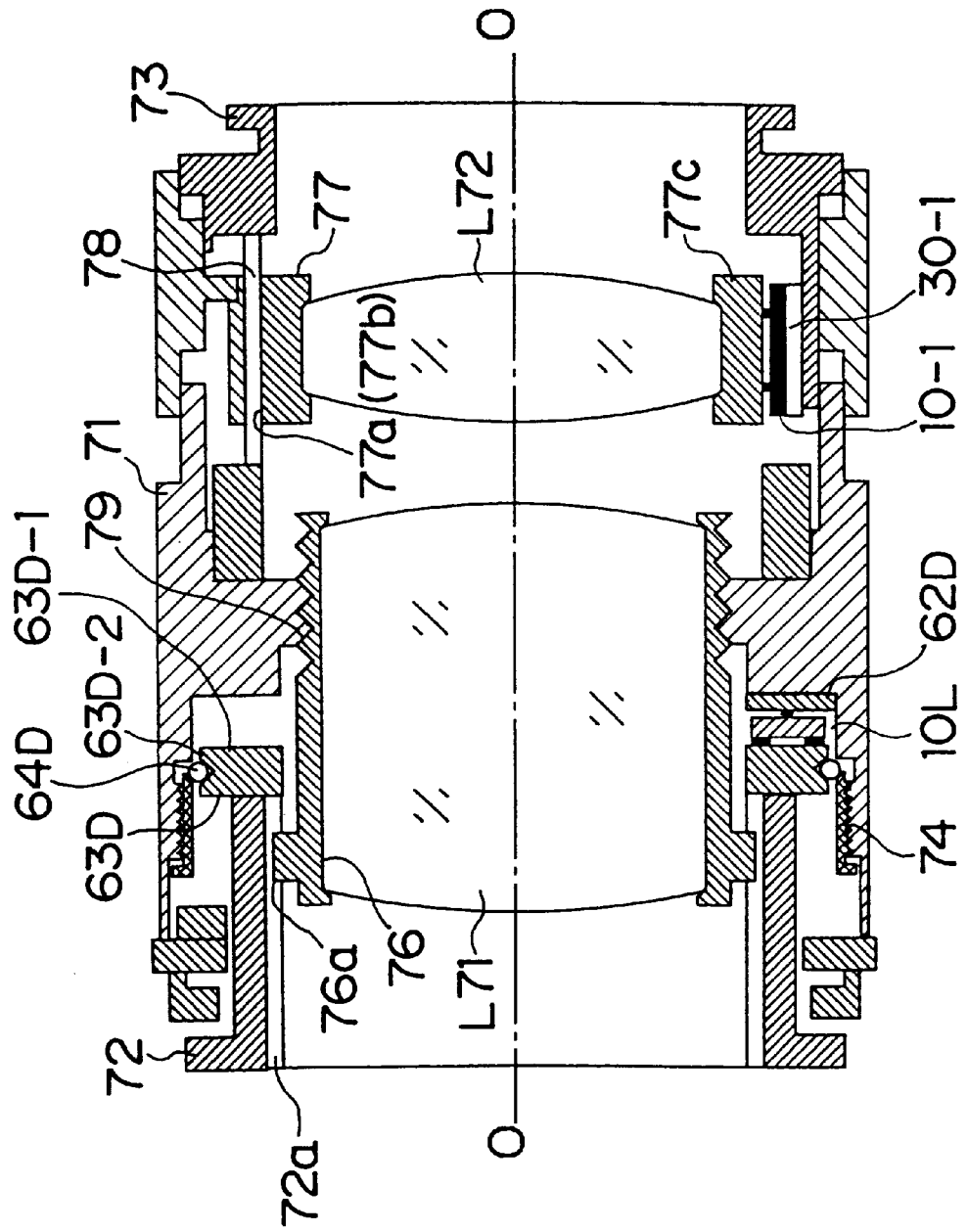
FIG. 20 is a cross section of a lens barrel in accordance with a seventeenth embodiment of the present invention.
Figure 21:
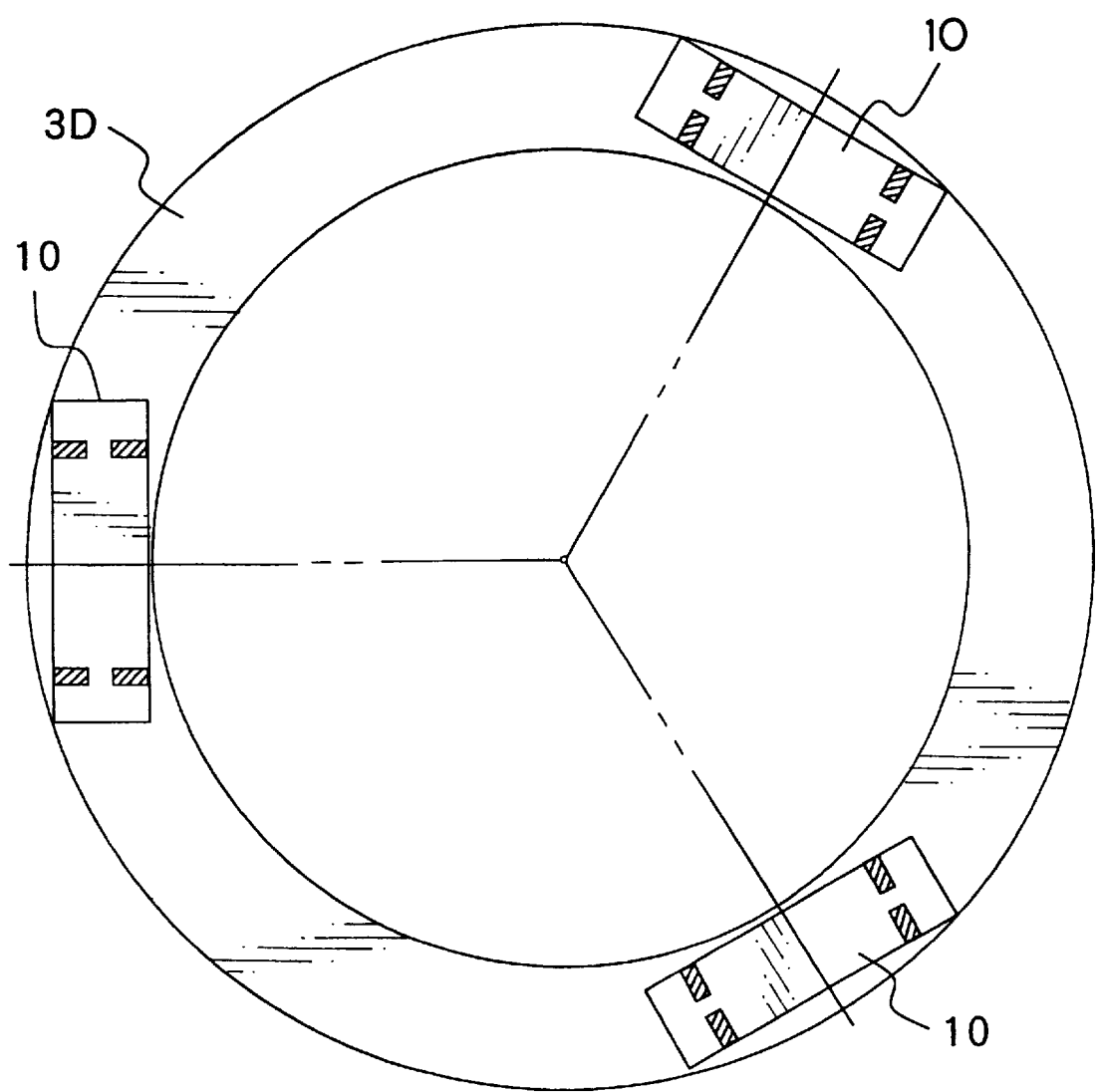
FIG. 21 illustrates a portion of a vibration actuator drive device of the lens barrel in accordance with the seventeenth embodiment of the present invention.

FIG. 20 is a cross-sectional diagram of a lens barrel in accordance with a seventeenth preferred embodiment of the present invention. FIG. 21 is a diagram which selectively illustrates a portion of the vibration actuator drive device of the lens barrel in accordance with the seventeenth embodiment of the present invention. As shown in FIG. 20, a frame 76 supports a focus adjustment lens L71. A rotary tube 72 is mounted for free rotation in the frame 76. A key groove 72a is formed parallel to the optical axis in the rotary tube 72. Moreover, a key 76a is formed in the frame 76 of the focus adjustment lens group L71. The key is engaged with the key groove 72a.

A rotary element 63D is integrally fixed in the end of the rotary tube 72 in the optical axis rear direction. The rotary element 63D has a flat portion 63D-1, intersecting perpendicular to the optical axis, in the optical axis rear direction. Moreover, the rotary element 63D has a circumferential groove 63D-2 in the outer circumferential surface. A ball 64D is covered by the circumferential groove 63D-2. The ball 64D causes rotary contact of the rotary element 63D with respect to a fixed tube 71, and is a member which maintains the smooth rotary motion of the rotary element 63D. A check ring 74 is screwed into the inner circumferential side of the fixed tube 71 in the forward optical axis direction of the ball 64D. The check ring 74 limits the movement of the ball 64D in the optical axis direction. The check ring 74 prevents the ball 64D from falling out after assembly of the lens barrel. Moreover, the check ring 74 also limits the movement in the optical axis direction of the rotary element 63D together with the ball 64D.

The rotary element 63D is arranged in the optical axis rear direction such that the ultrasonic actuator 10L faces the flat portion 63D-1 of the ultrasonic actuator 10L. Moreover, as shown in FIG. 21, three of the ultrasonic actuators are arranged at about equal mutual spacings. The ultrasonic actuators 10L are the same as those shown in FIG. 17, the compression support member 62D is the same as those shown in FIGS. 14 and 15, and compresses the ultrasonic actuators 10L in the direction toward the flat portion 63D-1 of the rotary element 63D.

A frame 77 supports a focal distance adjustment lens group L72. The frame 77 has through holes 77a, 77b (through hole 77b overlaps through hole 77a and is not shown in the figure) formed in the thickness of the material. Moreover, a flat portion 77c is formed in a portion of the outer circumference of the frame 77. Linear guides 78 are inserted in the through holes 77a, 77b. The linear guide 78 is arranged parallel to the optical axis, and is fixed to the fixed tubes 71 and 73. Moreover, a linear vibration actuator 10-1 is arranged in a position facing the flat portion 77c of the frame 77. The vibration actuator 10-1 is brought into compressive contact with the flat portion 77 by a compression member 30-1.

As described above, in accordance with the seventeenth preferred embodiment, in a manner similar to the lens barrel shown in FIG. 4, because the position setting accuracy of the focus adjustment lens group L71 in the optical axis direction is governed chiefly by the characteristics of the helicoid 79, the position setting accuracy is not related to the size of the units of the drive of the ultrasonic actuator 10L. By suitably setting the configuration of the helicoid 79, the position setting accuracy of the focus adjustment lens group L71 is increased, and it is possible to perform focus adjustment with high accuracy. Moreover, since the ultrasonic actuator 10L comes into contact with only a portion of the rotary element 63D, strict flatness requirements are not required for the flat portion 63D-1, and manufacture is made easy. Furthermore, the compressive force applied to the vibration actuator is smaller than in the case of an annular type of ultrasonic motor, and the structure of the compression support member of the vibration actuator or the peripheral members, which support these, is not required to be strong as is the case when an annular type of vibration actuator is used.

Furthermore, in accordance with the seventeenth preferred embodiment of the invention, the pins 62c, 62c' supported by the plate spring 62b are used in the assembled compression support member, and the space for the device may be small. Moreover, because compression and support are integrally performed, in addition to increasing the ease of assembly, the cost of components can be reduced. Furthermore, because the plate spring unit 62b is disposed in three places of the ring unit 62a, with respect to the relative motion member 63D, the three ultrasonic actuators 10L become independent, and are capable of compression and support, preventing floating or tilt from arising.

Eighteenth Preferred Embodiment of a Vibration Actuator Drive Device

Figure 22:
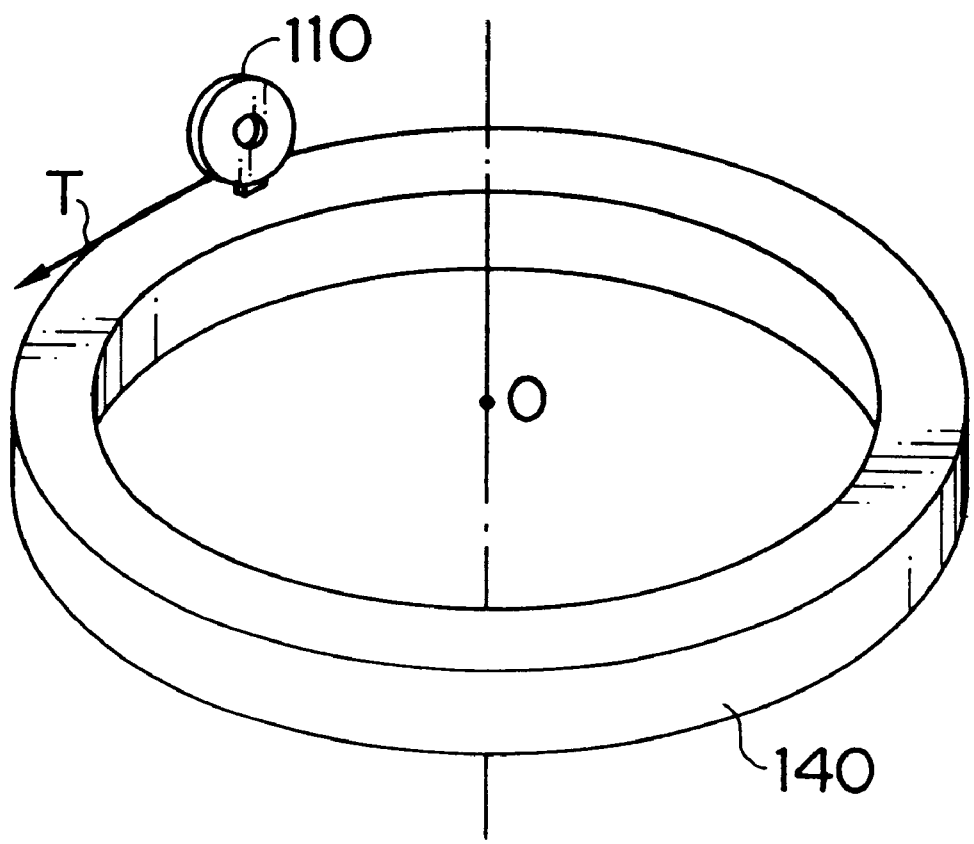
FIG. 22 is an oblique view of a vibration actuator drive device in accordance with an eighteenth embodiment of the present invention.
Figure 23A:
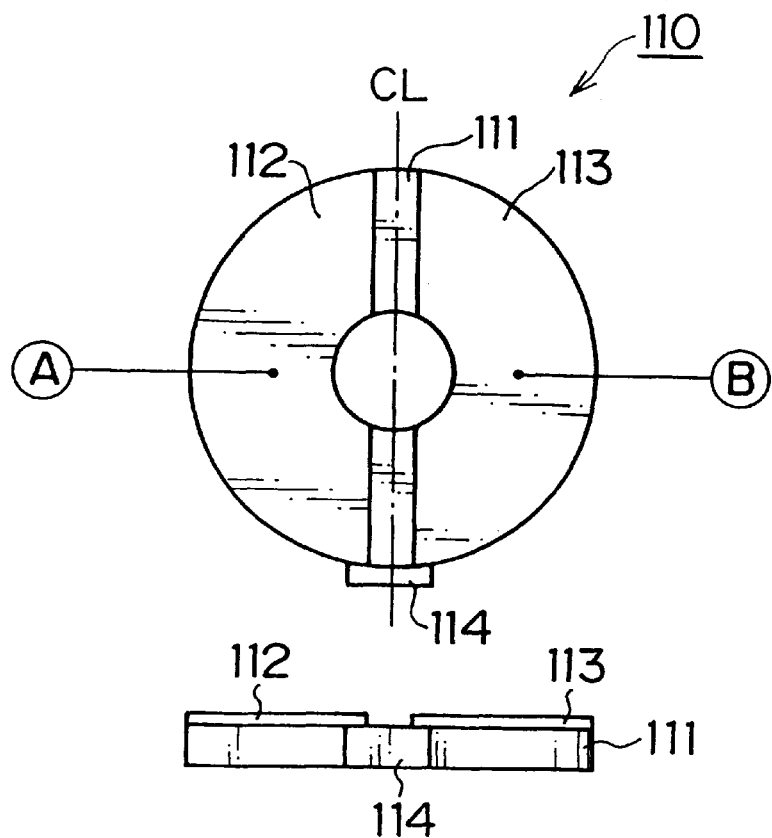
FIGS. 23(a) illustrates a front view and a plan view of a vibration element of a vibration actuator in accordance with the eighteenth embodiment of the present invention.
Figure 23B:
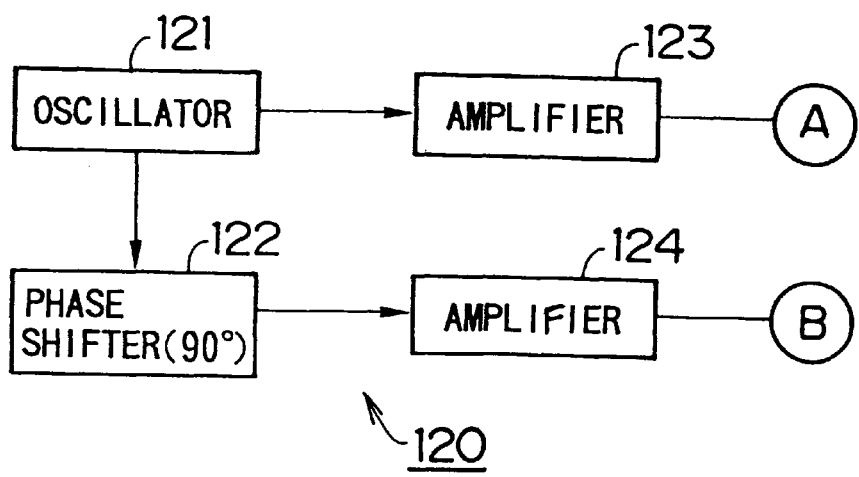
FIG. 23(b) is a block diagram of a drive circuit of a vibration actuator in accordance with the eighteenth embodiment of the present invention.
Figure 24A:
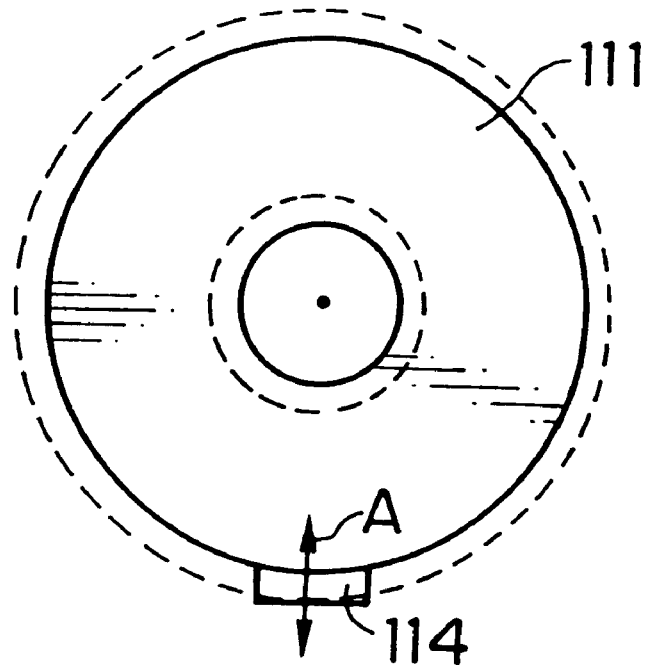
FIG. 24(a) illustrates a vibration state of an (R,1) mode which is a symmetrical stretching vibration.
Figure 24B:
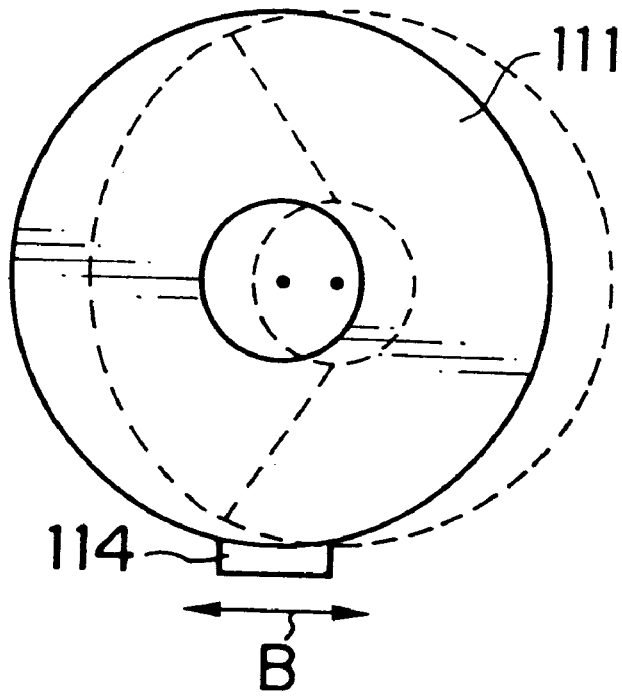
FIG. 24(b) illustrates a vibration state of a ((1,1)) mode of a non-axially symmetric vibration in accordance with embodiments of the present invention.

FIG. 22 is an oblique diagram of a vibration actuator drive device in accordance with an eighteenth embodiment of the present invention. FIGS. 23(a) and 23(b) are schematic diagrams of an ultrasonic actuator used in the vibration actuator drive device shown in FIG. 22. FIGS. 24(a)–24(b) are schematic diagrams showing the vibration configuration of an ultrasonic actuator in accordance with the eighteenth embodiment of the present invention.

The vibration actuator drive device in accordance with the eighteenth embodiment of the invention has a rotor (relative motion member) 140 and an ultrasonic actuator 110. As shown in FIG. 23(a), the ultrasonic actuator 110 is a vibration element 111 which comprises a donut plate shaped piezoelectric element, which is an electromechanical conversion element to convert electrical energy into mechanical energy. The ultrasonic actuator 110 further includes two half donut shaped electrodes 112, 113 formed on one side of the surface of the vibration element 111 symmetrically with respect to a center line CL, and a drive force output portion 114 disposed in a position which intersects the center line CL. The vibration element 111 has a dimensional ratio such as to simultaneously generate a stretching vibration (R,1) mode (FIG. 24(a)), symmetrical with respect to the diameter direction (surface direction), and a non-axisymmetric vibration ((1,1)) mode (FIG. 24(b)).

As shown in FIG. 23(b), a drive circuit 120 which drives the ultrasonic actuator 110 includes an oscillator 121 to output a drive signal of alternating current voltage of a predetermined frequency, a phase shifter 122 to effect a 90° change of the phase of the drive signal generated by the oscillator 121, an amplifier 123 to amplify the drive signal from the oscillator 121, and an amplifier 124 to amplify the drive signal from the phase shifter 122. The amplifier is connected to a terminal A and the amplifier 124 is connected to a terminal B. In the ultrasonic actuator 110, signals different in phase by 90° are input to the two electrodes 112, 113, as shown in FIG. 23(a), and the two modes become vibrations displaced in phase by 90°, and elliptical motion arises in the drive force output portion 114. If a rotary element 140 is brought into compressive contact with the drive force output portion 114, relative motion is generated between the ultrasonic actuator 110 and the rotary element 140.

Furthermore, the structure of the ultrasonic actuator may be, for example, as disclosed in Research Article, "Ultrasonic Linear Motor Using an Annular Piezoelectric Vibration Element", or New Edition, Ultrasonic Motors, Torikeppsu Edition: dated Dec. 20, 1991, pp. 67–68, 143–144.

As shown in FIGS. 24(a) and 24(b), the expansion and contraction surface of the symmetrical stretching vibration generated in the vibration element 111 (the arrow A shows the expansion and contraction direction in the drive force output portion 114) is approximately parallel to the axial direction (see FIG. 22) of the rotation axis O of the rotary element 140. Moreover, the direction of vibration (arrow B) of the non-axially symmetric vibration ((1,1)) mode is about orthogonal to the axial direction of the rotation axis O of the rotary element 140, approximately coinciding with the rotation tangent direction (see FIG. 22) of the rotary element 140. When a vibration of an (R, 1) mode, and a vibration of a ((1,1)) mode are simultaneously generated, an elliptical motion occurs in the drive force output portion 114, and the rotary element 140 is made to rotate. At this time, because the direction of vibration of the ((1,1)) mode and the circumferential direction of the rotary motion (tangential direction) approximately coincide, force can be transmitted with good efficiency.

In accordance with the eighteenth embodiment of the invention, an ultrasonic actuator 110 generates a symmetrical stretching vibration and a non-axially symmetric vibration. The axial direction of the rotation axis of the rotary element 140 is approximately parallel to the expansion and contraction plane of the symmetrical stretching vibration generated in the vibration element 111, and, because such as to be about orthogonal to the vibration direction of the non-axially symmetric vibration, the generation of sound while driving is small, and driving conditions with good transmission of force can be realized.

Nineteenth Preferred Embodiment

Figure 25A:
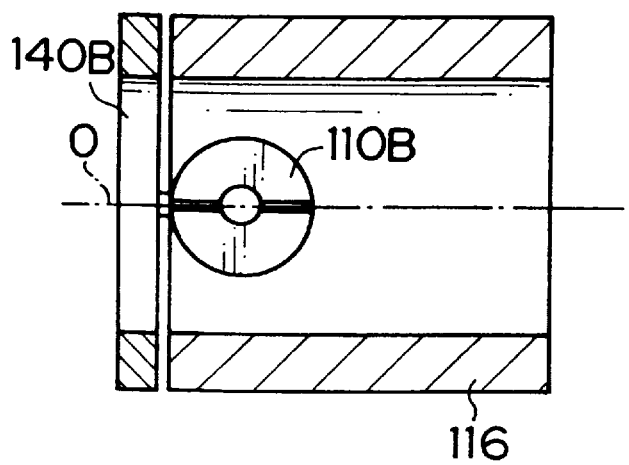
FIGS. 25(a) and 25(b) illustrate a lens barrel in accordance with a nineteenth embodiment of the present invention.
Figure 25B:
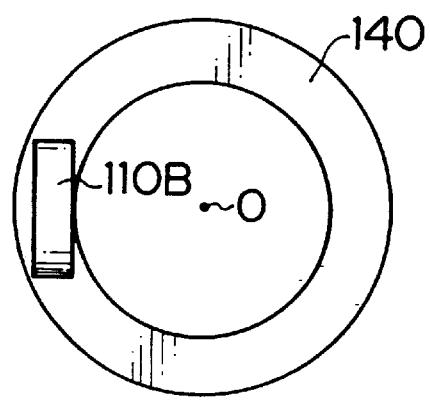
Figure 25C:
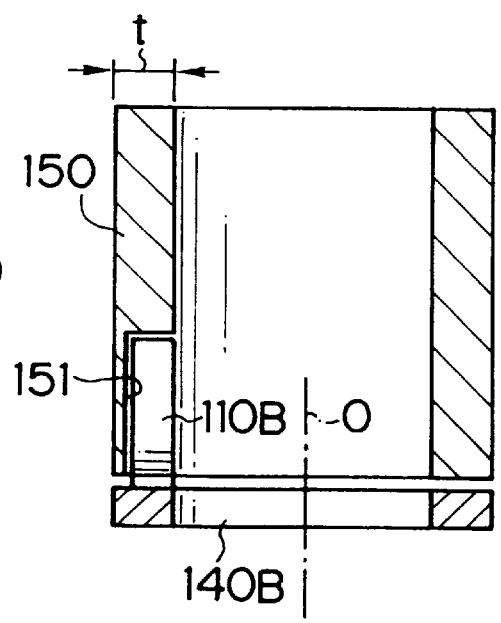

FIGS. 25(a)–25(c) are diagrams illustrating a lens barrel in accordance with a nineteenth embodiment of the present invention. As shown in FIGS. 25(a)–25(c), an ultrasonic actuator 110B is arranged within a housing unit 151 disposed within the thickness of a fixed tube 150 of the lens barrel. The expansion and contraction plane of the symmetrical stretching vibration which arises in a vibration element 111 of the ultrasonic actuator 110B is arranged approximately parallel to the axial direction of the rotation axis O of the rotary element 140B, and also, the vibration direction of the non-axially symmetric vibration approximately orthogonal to the axial direction of the rotation axis of the rotary element 140B. The rotary force of the rotary element 140B is transmitted to a movement mechanism of a moving lens which moves to perform focusing or zooming, etc. In accordance with the nineteenth embodiment of the invention, the ratio of inner and outer diameters of the lens barrel is small, and with respect to a lens barrel which is long in the rotation axis direction, it is possible to design the lens barrel with an improvement in space efficiency.

Twentieth Preferred Embodiment

Figure 26A:
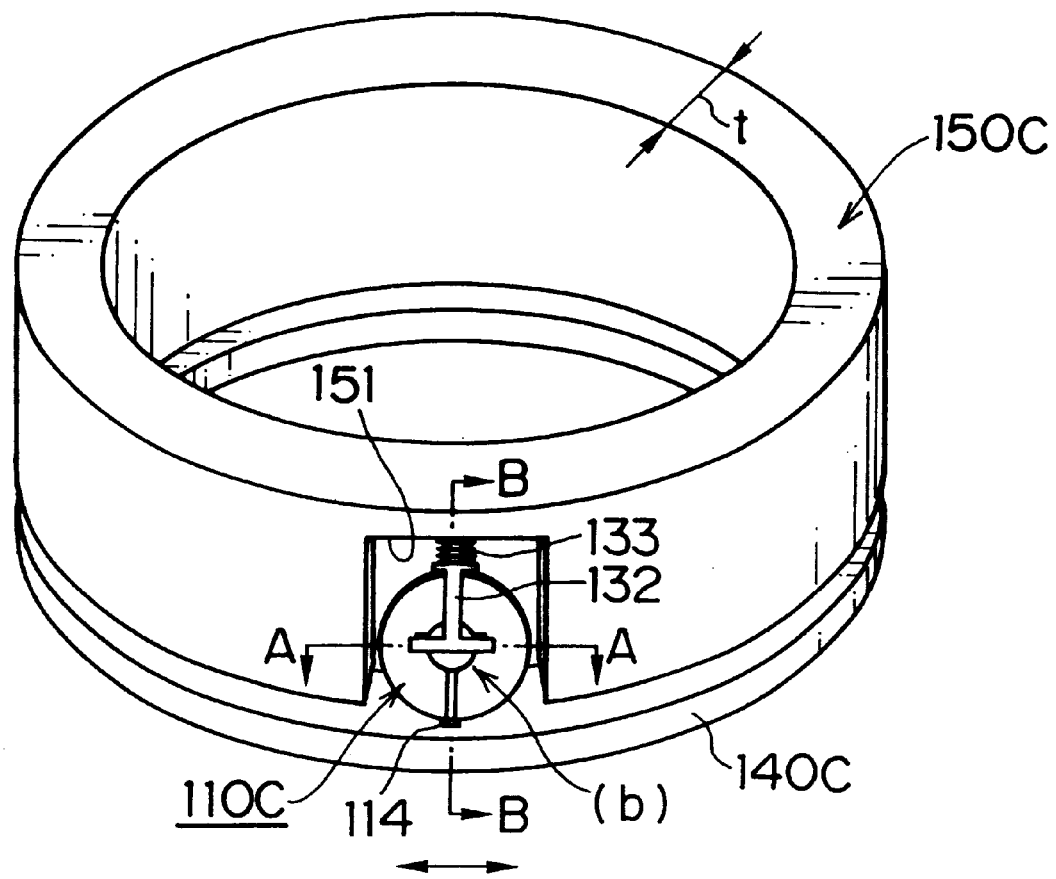
FIGS. 26(a) and 26(b) illustrate a lens barrel in accordance with a twentieth embodiment of the present invention.
Figure 26B:
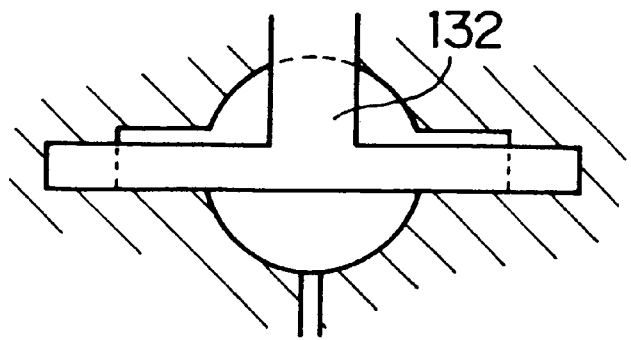
Figure 27:
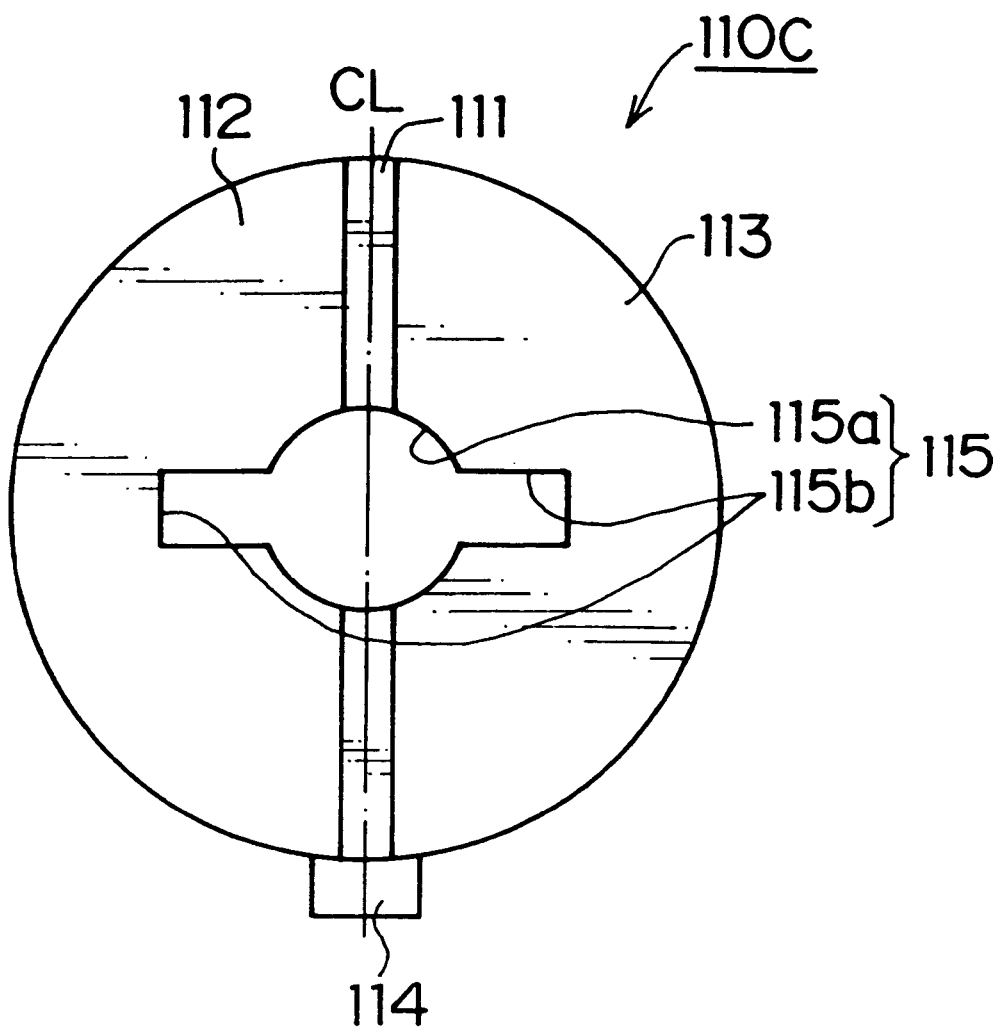
FIG. 27 is an enlarged view of the vibration element of FIG. 26 in accordance with the twentieth embodiment of the present invention.

FIGS. 26(a) and 26(b) are diagrams illustrating a twentieth embodiment of a lens barrel in accordance with the present invention. FIG. 27 is a diagram illustrating an enlargement of the vibration element of shown in FIGS. 26; FIGS. 28 and 29 are diagrams which show the support and compression mechanism of the vibration actuator drive device shown in FIG. 26. The lens barrel in accordance with the twentieth embodiment of the present invention includes an ultrasonic actuator 110C, and a fixed tube 150C having a housing unit 151 to house the ultrasonic actuator 110C. The lens barrel also includes a support member 132 to support the ultrasonic actuator 110C, a rotary element 140C, which is supported rotatably around the optical axis, and a compression member 133 which causes compressive contact between the ultrasonic actuator 110C and the rotary element 140C.

As shown in FIG. 29, the ultrasonic actuator 110C, is about annular in external appearance, and includes a vibration element 111C comprising a piezoelectric element formed with a central aperture 115 and formed parallel to one side of the vibration element 111C. The ultrasonic actuator 110C includes two electrodes 112, 113 arranged symmetrically in a state mutually separated with respect to the center line CL, and at the external circumference of the vibration element 111C. A drive force output portion 114 is disposed in a position which intersects the center line CL. The central aperture 115 includes a circular portion 115a formed about coaxially with the vibration element 111C, and two notch portions 115b formed in a rectangular shape in two places facing the circumference of the circular portion 115a. The housing unit 151 is formed in an about rectangular notch form in the outer surface side of the fixed tube 150C, and houses the ultrasonic actuator 110C within the thickness t of the fixed tube 150C.

Figure 28A:
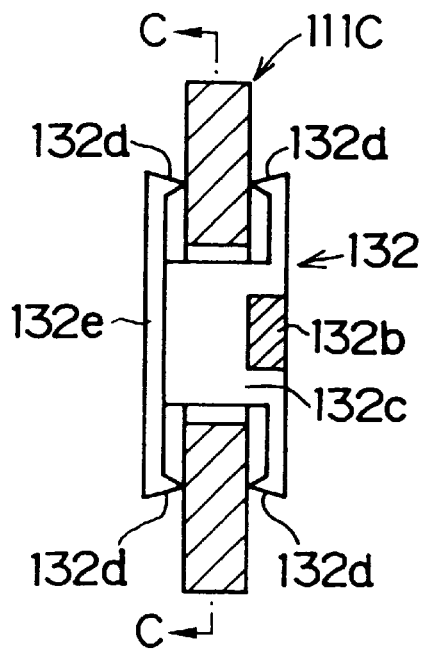
FIGS. 28(a) and 28(b) illustrate a support and compression mechanism of the vibration actuator drive device shown in FIG. 26.
Figure 28B:
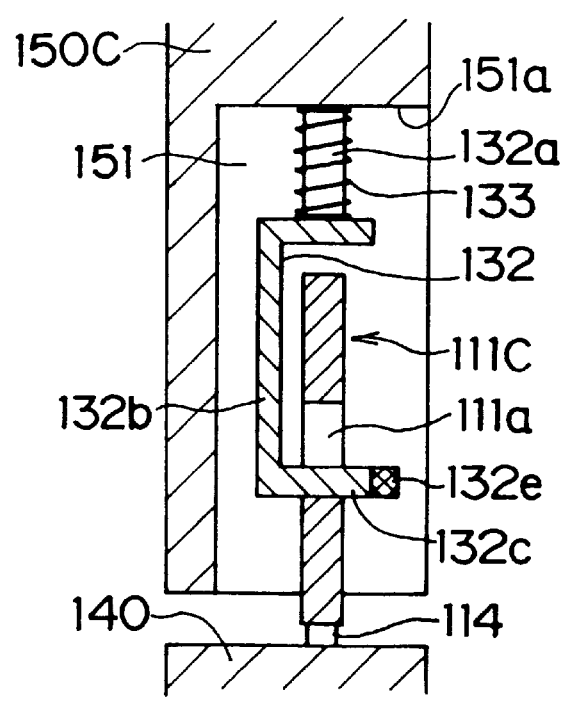

The support member 132 comprises a support pin 132a (see FIG. 28(b)) mounted in a ceiling unit 151a of the housing 151, and an L-shaped arm unit 132b disposed in the front end of the support pin 132a. A presser plate unit 132c (see FIG. 29(a)) presses the flat surface portion of the notch portion 115b of the vibration element 111C inserted in the aperture 115 of the vibration element 111C. A fixed unit 132e fixes such that the presser plate unit 132c inserted into the aperture 115 does not slip out, and is attached to the presser plate unit 132c by a screw or the like. The arm unit 132b is disposed movably in the axial direction of the support pin 132a. As shown in FIG. 29(b), the presser plate unit 132c is inserted into the aperture 115 of the vibration element 111C. At the lower surface of the presser plate unit 132C (region shown at P of FIG. 29), the presser plate unit 132c presses the flat surface of the notch portion 115b. As shown in FIG. 28(a) and FIG. 29(a), an arm unit is formed in the presser plate unit 132c and, in the fixed portion 132e, respectively, along the direction parallel to the contact surface of the drive force output portion 114 and the rotary element 140, in two directions facing the outer circumferential side from the center side of the vibration element 111C. A projecting unit (position regulating member) 132d (see FIGS. 28(a) and 29(a)) is formed at the end of each arm unit to prevent blurring motion (movement with the line B—B of FIG. 26 as a rotation axis), inserting the vibration element 111C. By inserting the vibration element 111C between the projecting unit 132d toward the presser plate unit 132c, and the projecting unit 132d toward the fixed unit 132e, the combination of the vibration element 111C and the support member 132 prevents blurring motion of the vibration element 111C.

The compression member 133 comprises a coil spring inserted in the support pin 132a, and by pressing an upper plate 132b' of the arm unit 132b downward and, via the presser member 132c, presses the drive force output portion 114 onto the rotary element 140. The length of the coil spring is set equal to the distance of the ceiling of the housing unit 151 and the upper plate 132b' of the arm unit 132b, such that it presses the drive force output portion 114 to the rotary element 140 with a predetermined pressure.

While assembling the ultrasonic actuator 110C into the lens barrel with the compression member 133 (i.e., coil spring in the mounted state) the support pin 132a of the support member 132 is fixed in the ceiling portion 131a of the housing unit 151 of the fixed tube 150C. At this time, the fixed unit 132e of the support member 132 is detached from the presser plate member 132c. Moreover, the arm unit 132b of the support member 132 is arranged facing close to the wall surface interior of the housing unit 151. The vibration element 111C of the ultrasonic actuator 110C is then arranged in the housing unit 131 such that the presser plate unit 132c is inserted into its aperture 115. Finally, the fixed portion 132e of the support member 132 is fixed by screws etc. in the presser plate 132c.

In accordance with the twentieth embodiment of the present invention, the ultrasonic actuator 110, the support unit 132 and the compression unit 133 can house with good efficiency in the space of the thickness portion of the fixed tube 150C. Moreover, because the support member 132 presses the vibration element 111C into contact with the thickness portion (flat surface portion) of the notch portion 115b, a stabilized compression support is possible. Furthermore, because the vibration element 111C is regulated from both surfaces, stable support is possible, and furthermore, driving with good efficiency is possible.

Twenty-First Preferred Embodiment

Figure 30:
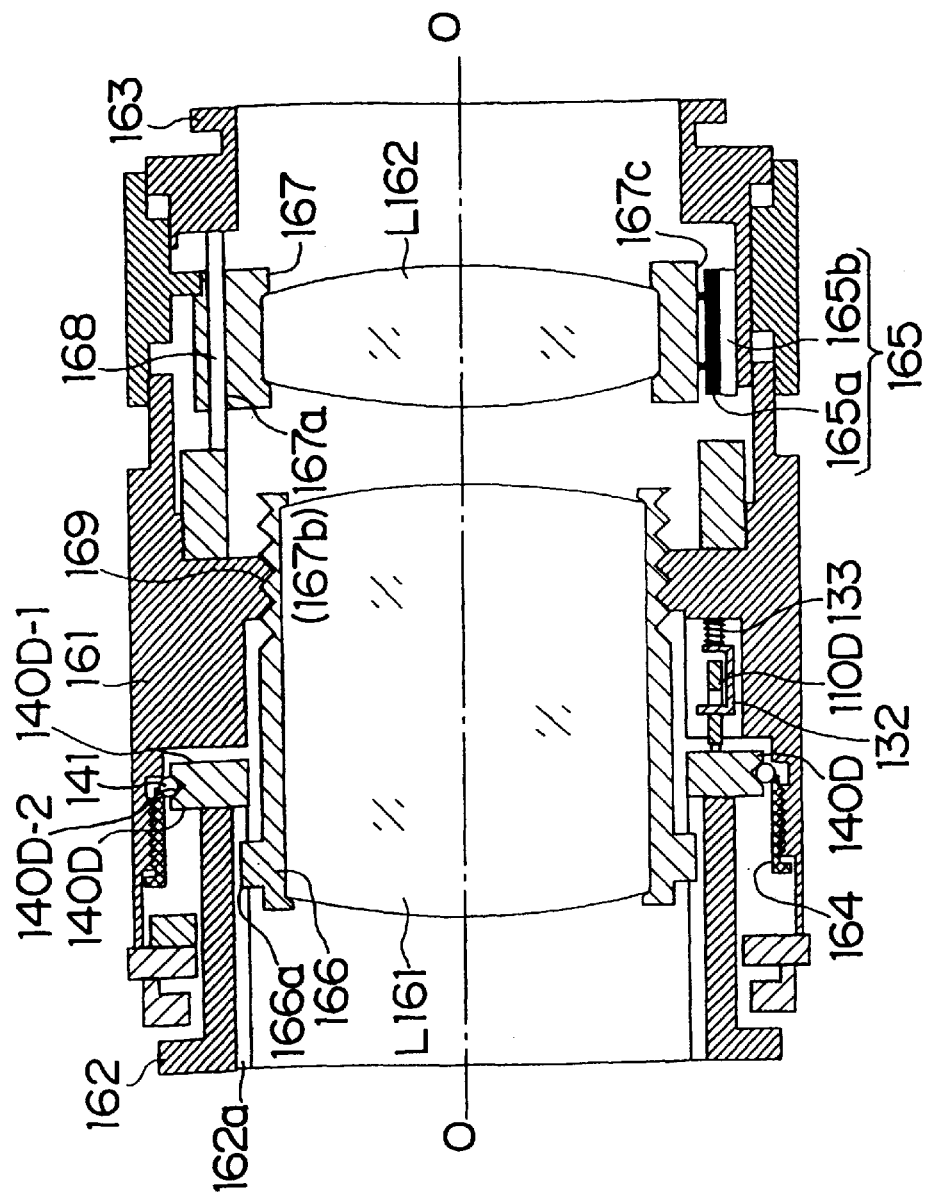
FIG. 30 is a cross sectional diagram of a lens barrel in accordance with a twenty-first embodiment of the present invention.
Figure 31:
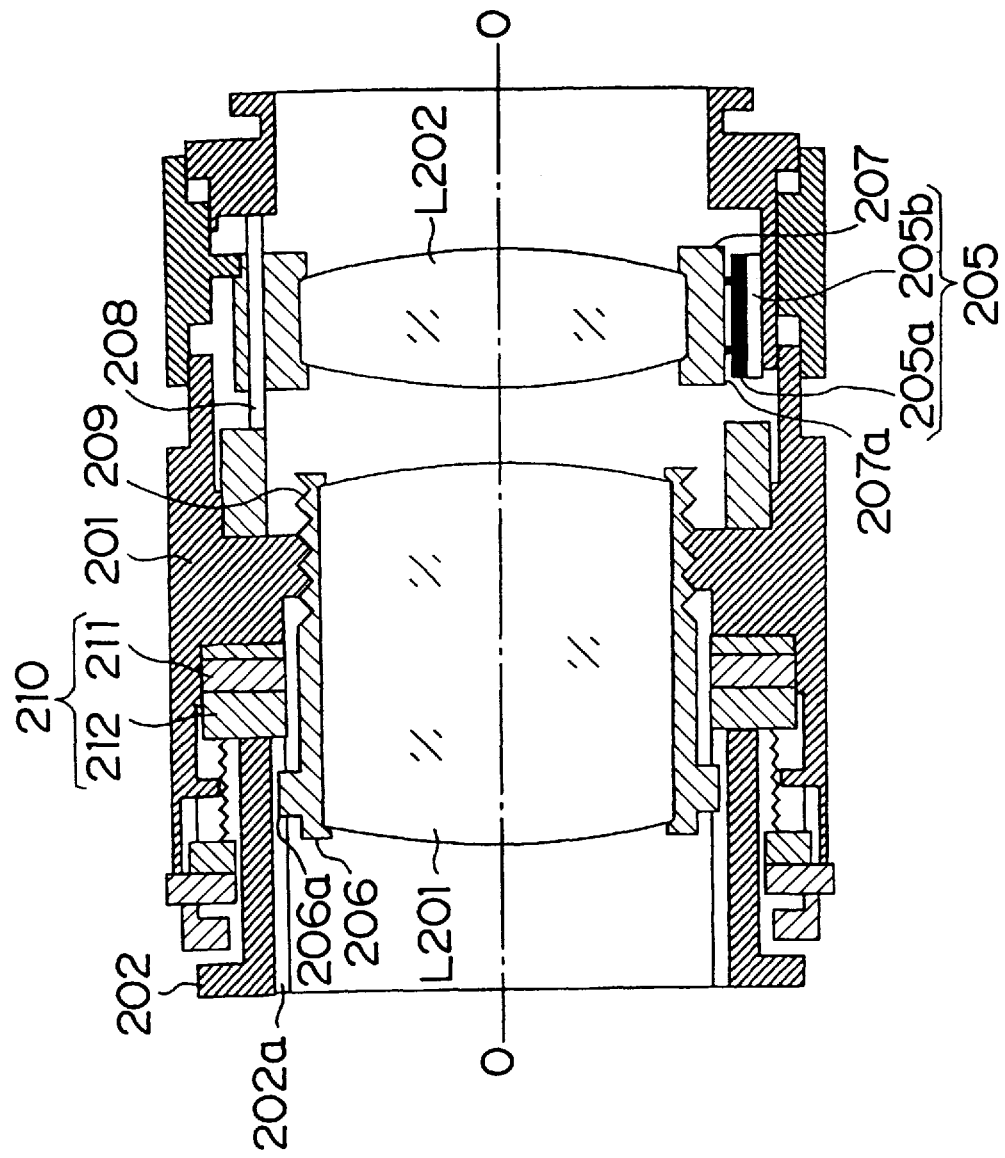
FIG. 31 is a cross sectional diagram of a conventional lens barrel.

FIG. 30 is a cross sectional diagram of a twenty-first embodiment of a lens barrel in accordance with the present invention. As shown in FIG. 30, a frame 166 is connected by a helicoid 169 to a fixed tube 161. In the forward optical axis direction of the fixed tube 161, a rotary tube 162 is mounted to rotate freely. A key groove 162a is formed parallel to the optical axis in the inner circumference of the rotary tube 162. Moreover, a key 166a is formed in the frame 166 of the focus adjustment lens group L161, and the key 166a engages in the key groove 162a.

A rotary element 140D is integrally fixed in the end portion in the optical axis rear direction of the rotary tube 162. The rotary element 140D has a flat portion 140D-1 in the optical axis rear direction which intersects the optical axis perpendicularly. Moreover, the rotary element 140D has a circumferential groove 140D-2 in the outer circumferential surface. A ball 141 is covered by the circumferential groove 140D-2. The ball 141 causes rolling contact of the rotary element 140 with respect to the fixed tube 161, and is an element which maintains smooth rotary motion of the rotary element 140D. In the forward optical axis direction of the ball 141, a check ring 164 is screwed into the inner circumferential side of the fixed tube 161. The check ring 164 limits the movement of the ball 141 in the optical axis direction. The action of the check ring 164 prevents the ball 141 from falling out from the lens barrel after the lens barrel has been assembled. Moreover, the check ring 164 limits the movement of the rotary element 140D in the optical axis direction.

The drive force output portion 114 of the ultrasonic actuator 110D is arranged in the optical axis rear direction of the rotary element 140D, such that the drive force output portion 114 contacts the flat portion 140D-1. The ultrasonic actuator 110D is the same as that shown in FIG. 26. The support member 132 and compression member 133 are the same as shown in FIGS. 26–29, and compress the vibration element 111 in the direction of the flat portion 140D-1 of the rotary element 140D.

A frame 167 supports a focal distance adjustment lens group L162. The frame 167 includes through holes 167a, 167b (167b overlaps 167a and is not shown in the figure) which are formed parallel to the optical axis direction in the thickness of the material. Moveover, a flat portion 167c is formed in a portion of the outer circumference of the frame 167. A linear guide 168 is inserted in the through hole 167a, 167b. The linear guide 168 is arranged parallel to the optical axis, and is fixed to the fixed tubes 161 and 163. Moreover, a linear type of vibration actuator 165 is arranged to face the flat portion 167c of the frame 167. The vibration actuator 165 comprises a vibration element 165a and a piezoelectric member 165b.

As described hereinabove, in accordance with the twenty-first embodiment of the invention, in a manner similar to the lens barrel of FIG. 4, the position setting accuracy of the focus adjustment lens group L161 is chiefly determined by the characteristics of the helicoid 169, and is largely unrelated to the drive units of the ultrasonic actuator 110D. By suitably setting the shape of the helicoid 169, it is possible to increase the position setting accuracy of the focus adjustment lens group L161 and to perform focus adjustment with high accuracy. Moreover, since the ultrasonic actuator 110D contacts only a portion of the rotary element 140D, the flatness requirement on the flat portion 140D-1 is not too strict and manufacturing is easy.

Furthermore, in accordance with the twenty-first embodiment of the invention, the ultrasonic actuator uses a symmetrical stretching vibration and a non-axially symmetric vibration, and because the axial direction of the rotation axis of the rotary member 140D is approximately parallel to the expansion and contraction plane of the symmetrical stretching vibration arising in the vibration element 111, and also is about orthogonal to the direction of vibration of the non-axially symmetric vibration, the sound which arises when driving is small, and driving conditions can be realized with good efficiency of force transmission. The space in the thickness portion of the fixed ring 161 can efficiently house the ultrasonic actuator 110, support member 132 and compression member 133. Moreover, because the support member 132 presses the vibration element 111 in contact with the thickness portion (flat portion) of the notch portion 115b, stabilized compression and support become possible. Furthermore, because the vibration element 111 is controlled on both surfaces, the support can be stabilized, and driving is possible with good efficiency.

The present invention can be embodied in various forms without departing from the spirit or essential features of the invention. Accordingly, the present invention is not limited to the embodiments described above. As discussed below, modifications or changes within the scope of the claims are all within the scope of the present invention.

In accordance with the embodiment of the invention shown in FIG. 2, a plurality of piezoelectric elements are affixed to the elastic member 11 of the ultrasonic actuator 10. However, by dividing one piezoelectric element into four, four electrodes may be disposed on the surface of the elastic member 11.

In accordance with the embodiment of the invention shown in FIG. 4, a flat surface 40a is disposed in the rotary element 40B perpendicular to the optical axis, and drive force of the ultrasonic actuator 10 acts on the flat surface 40a. However, by arranging the ultrasonic actuator 10 in the outer circumferential surface of the rotary element 40B, the drive force may act on the outer circumferential surface. In this case, the problems of slip between the drive force output portion and rotary element described in FIG. 7, etc. do not arise, and the effect is obtained that the lens barrel can be made of smaller form in the optical axis direction.

In accordance with the embodiment of the invention shown FIG. 4, the focal distance adjustment lens group 52 is directly driven by a linear type of ultrasonic actuator. However, the focal distance adjustment lens group 52 may also be driven using a mechanism similar to that for the focus adjustment lens group L51.

In accordance with the embodiment of the invention shown in FIGS. 10 and 12, the coefficient of friction differs in two places in the diameter direction. However, the coefficient of friction may be different at three or more places.

In accordance with the embodiments of the invention as described above, a rotary member has been described as the relative motion member which performs relative motion in compressive contact with the ultrasonic actuator. However, the present invention can also be applied to the case in which an ultrasonic actuator self-propels a rail having a circular or arcuate corner.

In accordance with the first through sixteenth embodiments of the ultrasonic actuator drive device, an ultrasonic actuator was described which generates a first order longitudinal vibration and a fourth order bending vibration. However, the present invention is applicable to an ultrasonic actuator which generates an n-th order longitudinal vibration an m-th order bending vibration.

In accordance with the embodiment of the invention shown in FIG. 17, the drive force output portion 114 is formed as a projection; however, a frictional material may be adhered as the drive force output portion 114. Moreover, the relative motion member is not limited to a ring-shaped one if it is one having an orbit which includes a rotary motion, and may be any having a rotation of less than 360° motion such that the curvature of a circle changes, and the like.

The vibration actuator drive device in accordance with the embodiments of the invention can be employed in a lens barrel, similarly to the embodiments shown in FIG. 4, FIG. 20, FIG. 30 etc. Further, in accordance with the embodiments shown in FIG. 4 and FIG. 30, one ultrasonic actuator was described. However, as shown in FIG. 20, plural ultrasonic actuators, for example three, may be provided.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A vibration actuator drive device, comprising:
    a vibration actuator to generate a first vibration and a second vibration to produce a drive force;
    a relative motion member contacting the vibration actuator and undergoing relative motion with respect to the vibration actuator in a curved line locus of predetermined amplitude;
    a compression mechanism to place the vibration actuator and the relative motion member in compressive contact,
    wherein the first vibration vibrates in a direction approximately parallel to the direction of the drive force, the second vibration vibrates in a direction intersecting the first vibration, and the drive force is transmitted to the relative motion member at an inner circumferential side of the curved line locus of the relative motion member and at an outer circumferential side of the curved line locus, the drive force transmitted to the inner circumferential side and the drive force transmitted to the outer circumferential side being different in magnitude.

2. A vibration actuator drive device as recited in claim 1, wherein the drive force transmitted to the outer circumferential side of the curved line locus and the drive force transmitted to the inner circumferential side of the curved line locus are set based on the circumferential speed of the inner circumferential side and the circumferential speed of the outer circumferential side with respect to the relative motion member.

3. A vibration actuator drive device as recited in claim 1, further comprising:
    a drive force output portion to transmit the drive force to the relative motion member,
    wherein the second vibration is a bending vibration, and the vibration amplitude of the bending vibration in the drive force output portion is set based on the circumferential speed with respect to the relative motion member in the position contacting the relative motion member.

4. A vibration actuator drive device as recited in claim 1, further comprising:

a drive force output portion to transmit the drive force to the relative motion member, wherein the first vibration is a longitudinal vibration, and the vibration amplitude of the longitudinal vibration in the drive force output portion is set based on the circumferential speed with respect to the relative motion member in the position contacting the relative motion member.

5. A vibration actuator drive device as recited in claim 1, further comprising:

a plurality of drive force output portions to transmit the drive force to the relative motion member, wherein the plurality of drive force output portions are located on the curved line locus and the number of drive force output portions is decided based on the circumferential speed with respect to the relative motion member in the position contacting the relative motion member.

6. A vibration actuator drive device as recited in claim 1, further comprising:

a drive force output portion to transmit the drive force to the relative motion member, wherein the drive force output portion contacts the relative motion member in one of the inner circumferential side and the outer circumferential side of the curved line locus.

7. A vibration actuator drive device as recited in claim 1, further comprising:

a drive force output portion to transmit drive force to the relative motion member, wherein the compression mechanism generates a compressive force between the drive force output portion and the relative motion member and the compressive force is set based on the circumferential speed with respect to the relative motion member in a contact position of the drive force output portion and the relative motion member.

8. A vibration actuator drive device as recited in claim 1, further comprising:

a drive force output portion to transmit drive force to the relative motion member, wherein the respective coefficients of friction in a contact surface between the relative motion member and the drive force output portion differ according to location.

9. A vibration actuator drive device as recited in claim 8, wherein the drive force output portion comprises a plurality of drive force output portions in the width direction of the vibration actuator respectively comprising different materials.

10. A vibration actuator drive device as recited in claim 8, wherein the relative motion member is subdivided into a plurality of sections in the width direction of a contact surface with the vibration actuator, the plurality of sections respectively comprising different materials.

11. A vibration actuator drive device as recited in claim 1, wherein the compression mechanism includes a plurality of compression mechanisms in the width direction of the vibration actuator, the plurality of compression mechanisms being set to respective different compressive forces.

12. A vibration actuator drive device as recited in claim 1, wherein the relative motion member has a ring shape, and the compression mechanism includes a ring-shaped base unit, a plate spring unit cantilever supported on the base unit, and a support unit to support the vibration actuator in a free end side of the plate spring unit.

13. A vibration actuator drive device as recited in claim 12, wherein the free end of the plate spring unit faces in a circumferential direction of the relative motion member.

14. A vibration actuator drive device as recited in claim 12, wherein the free end of the plate spring unit faces in a radial direction of the relative motion member.

15. A vibration actuator drive device as recited in claim 14, wherein a compression force of the plate spring unit is adjustable in the radial direction of the relative motion member.

16. A vibration actuator drive device as recited in claim 1, further comprising:

a support mechanism to support the vibration actuator, the support mechanism including a first support unit to support the vibration actuator from the upper surface, and a second support unit to support the vibration actuator from the side surface, wherein the relative motion member has a ring shape.

17. A vibration actuator drive device as recited in claim 1, wherein the curved line locus is a circular locus or an arcuate locus.

18. A lens barrel, comprising;

a support member to support at least a portion of an optical system, and which is movable in a direction of the optical axis of the optical system;

a vibration actuator to generate a first vibration and a second vibration to produce a drive force;

a relative motion member contacting the vibration actuator and undergoing relative motion with respect to the vibration actuator in a curved line locus of predetermined amplitude;

a compression mechanism to place the vibration actuator and the relative motion member in compressive contact;

a conversion unit to convert rotary motion around the optical axis into linear motion in the optical axis direction and to transmit the linear motion to the support member;

wherein the relative motion member comprises a rotary unit rotatable around the optical axis, the vibration actuator drives the rotary unit in rotation by frictional contact with a portion of the rotary unit, and the conversion unit converts the rotary motion of the rotary unit into linear motion in the optical axis direction.

19. A lens barrel as recited in claim 18, wherein the vibration actuator includes a drive force output portion contacting the relative motion member to transmit the drive force, and the respective coefficients of friction in a contact surface of the relative motion member and the drive force output portion differ according to location.

20. A lens barrel as recited in claim 18, wherein the compression mechanism includes a ring-shaped base unit, and a plate spring unit cantilever supported by the base unit, and a support unit to support the vibration actuator disposed in a free end side of the plate spring unit.

21. A lens barrel as recited in claim 18, wherein the curved line locus is a circular locus or an arcuate locus.

22. A vibration actuator drive device, comprising:

a vibration actuator to generate drive forces which harmonically generate a stretching vibration which expands and contracts in a predetermined plane, and a non-axially symmetric vibration; and a relative motion member, contacting the vibration actuator, to generate relative motion including rotary motion in at least one portion with respect to the vibration actuator, wherein the direction of the rotation axis of the rotary motion is approximately parallel to the predetermined plane, and approximately orthogonal to the vibration direction of the non-axially symmetric vibration.

23. A vibration actuator drive device as recited in claim 22, wherein the vibration actuator comprises:

a vibration element formed in a plate shape;

a compression mechanism to generate a compressive force between the vibration element and the relative motion member;

an aperture portion disposed in the vibration element, including the center of the vibration element in the predetermined plane, wherein the compression mechanism causes the compressive force to act in the vicinity of the aperture portion of the vibration element.

24. A vibration actuator drive device as recited in claim 23, wherein the compression mechanism contacts the vibration element in an aperture portion of the vibration element causing the compressive force to act in the contact surface.

25. A vibration actuator drive device as recited in claim 23, further comprising:

a flat surface portion formed in the aperture portion about parallel to the vibration direction of the non-axially symmetric vibration, wherein the compression mechanism contacts the vibration element in a flat surface portion of the vibration element causing a compressive force to act in a contact surface and compresses the vibration element in the direction of the relative motion member.

26. A vibration actuator drive device as recited in claim 23, further comprising:

a location control member to control the motion in a direction intersecting a surface including the stretching vibration of the vibration element.

27. A vibration actuator drive device as recited in claim 22, wherein said non-axially symmetric vibration is vibration in a surface of the plane.

28. A lens barrel, comprising:

a support member to support at least a portion of an optical system, and which is movable in a direction of an optical axis of the optical system;

a vibration actuator to generate drive forces which harmonically generate a stretching vibration which expands and contracts in a predetermined plane, and a non-axially symmetric vibration;

a relative motion member, contacting the vibration actuator, to generate relative motion including rotary motion in at least a portion with respect to the vibration actuator; and a conversion unit to convert the rotary motion around the optical axis to linear motion in the optical axis direction, wherein the relative motion member includes a rotary unit which is rotatable around the optical axis, the vibration actuator drives the rotary unit to rotate by frictional contact with a portion of the rotary unit, and the conversion unit converts the rotary motion of the rotary unit into rectilinear motion in the optical axis direction.

* * * * *